United States Patent
Paladino et al.

(10) Patent No.: US 8,327,351 B2
(45) Date of Patent: Dec. 4, 2012

(54) APPLICATION MODIFICATION FRAMEWORK

(75) Inventors: Gaetano Paladino, North Reading, MA (US); Al J. Marcella, Tweksbury, MA (US); Kamal Nash, Cambridge, MA (US); Aileen Zhou, Lexington, MA (US)

(73) Assignee: SAP AG, Walldorf (DE)

( * ) Notice: Subject to any disclaimer, the term of this patent is extended or adjusted under 35 U.S.C. 154(b) by 888 days.

(21) Appl. No.: 12/433,521

(22) Filed: Apr. 30, 2009

(65) Prior Publication Data

US 2010/0281458 A1    Nov. 4, 2010

(51) Int. Cl.
  G06F 9/445    (2006.01)
(52) U.S. Cl. ........ 717/177; 717/106; 717/111; 717/168; 717/174; 717/176
(58) Field of Classification Search .......... 717/106–109, 717/111, 168–178
See application file for complete search history.

(56) References Cited

U.S. PATENT DOCUMENTS

| | | | | |
|---|---|---|---|---|
| 2002/0104071 | A1* | 8/2002 | Charisius et al. | 717/109 |
| 2003/0018950 | A1* | 1/2003 | Sparks et al. | 717/100 |
| 2003/0144894 | A1* | 7/2003 | Robertson et al. | 705/8 |
| 2005/0132345 | A1* | 6/2005 | Pessolano | 717/159 |
| 2005/0132349 | A1* | 6/2005 | Roberts et al. | 717/168 |
| 2006/0075001 | A1* | 4/2006 | Canning et al. | 707/203 |
| 2008/0256510 | A1* | 10/2008 | Auerbach | 717/107 |
| 2009/0150872 | A1* | 6/2009 | Russell et al. | 717/140 |

OTHER PUBLICATIONS

Enrique Duvos et al., An Infrastructure for the Dynamic Distribution of Web Applications and Services, Dec. 2000, Department of Computer Science Boston University.*
"European Application Serial No. 10004358.7, Extended European Search Report mailed Aug. 3, 2010", 7 pgs.
"Sandbox (Software Development)", [Online]. Retrieved from the Internet: <URL: http://en.wikipedia.org/w/index.php?title=Sandbox_(software_development)&oldid=284332437>, (Apr. 17, 2009), 4 pgs.
Guendisch, D, "Hot Deployment of KMC Components", [Online]. Retrieved from the Internet: <URL: http://www.sdn.sap.com/irj/scn/go/portal/prtroot/docs/library/uuid/bb1f18be-0801-0010-ffa0-e3495f7401bc?QuickLink=index&overridelayout=true>, (Jan. 11, 2006), 6 pgs.

* cited by examiner

*Primary Examiner* — Lewis A Bullock, Jr.
*Assistant Examiner* — Tina Huynh
(74) *Attorney, Agent, or Firm* — Schwegman Lundberg Woessner P.A.

(57) ABSTRACT

Methods and apparatus for an application modification framework used in an integrated technology platform are shown, which allows hot deployment of modifications, including a modification component, a hot deployment component, and a package manager component. The framework provides various editors to allow a developer of the base application or a custom client application to edit files and features associated with the application. Managers are provided to control each of the editors and for maintenance of historical information to allow auditing and modification monitoring. Hot deployment controls the ability of the user to implement modifications and changes, wherein changes are identified as to origin and purpose, allowing smart debug to identify if error(s) occurred during custom modification, base modification or otherwise.

33 Claims, 32 Drawing Sheets

STRINGS EDITOR

SEARCH FOR STRINGS

APPLICATION NAME [CALENDAR ⌄]   LANGUAGE [EN ⌄]

DATABASE NAME: [DEFAULT ⌄]

[          ]  SEARCH

<< 1 >>

SEARCH RESULT

| DELETE | EDIT | STRING TEXT | STRING CODE | ID | PAGE CATEGORY |
|--------|------|-------------|-------------|-----|---------------|
| ⊗ | ✎ | RESET DATE | CALENDAR 0_0 | ..332 | CALENDAR |
| ⊗ | ✎ | CALENDAR | CALENDAR 0_1 | ...332 | CALENDAR |
|   |   |             |              |       |               |

<< 1 >>

STRINGS EDITOR

ADD STRINGS

STRING TEXT: [                    ]

STRING CODE: [          ]

ENTERED CODE: [          ]

LANGUAGE [DA ⌄]   DATABASE NAME: [DEFAULT ⌄]

[ ADD STRING ]

FIG. 16

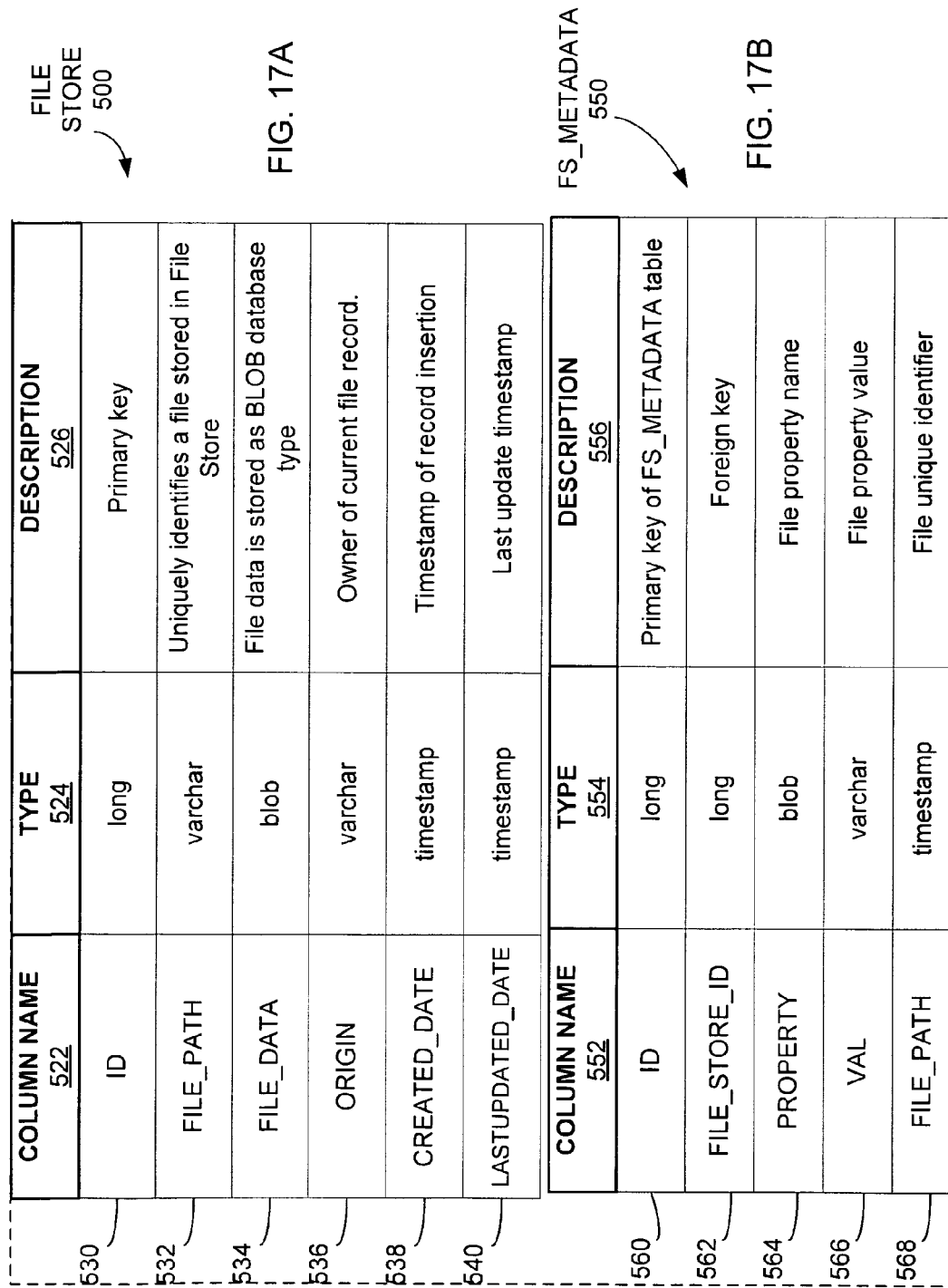

FS_PERMISSION 600

| COLUMN NAME 622 | TYPE 624 | DESCRIPTION 626 |
|---|---|---|
| ID | long | Primary key |
| FILE_STORE_ID | long | Foreign Key to table FILE_STORE |
| PERMISSION_ID | long | Foreign key to permission table. |
| ACL_ID | varchar | Access Control List id, foreign key |
| CREATED_DATE | timestamp | |
| LASTUPDATED_DATE | timestamp | |

FIG. 18A

FS_SHADOW 660

| COLUMN NAME 662 | TYPE 664 | DESCRIPTION 666 |
|---|---|---|
| ID | long | Primary key |
| FILE_STORE_ID | long | File unique identifier |
| PROPERTY | blob | File content |
| VAL | varchar | File owner |
| FILE_PATH | timestamp | Foreign key to transport audit table |

FIG. 18B

HOT_DEPLOY_AUDIT 700

| COLUMN NAME 702 | TYPE 704 | DESCRIPTION 706 |
|---|---|---|
| ID | long | Primary key |
| FILE_STORE_ID | long | File unique identifier |
| PROPERTY | blob | File content |
| VAL | varchar | File owner |
| FILE_PATH | timestamp | Foreign key to transport audit table |

APPLICATION MODIFICATION FRAMEWORK

TECHNICAL FIELD

Example embodiments relate to the field of electronic data processing and specifically to modification of applications, such as modifying a generic JAVA application.

BACKGROUND

As integrated technology platforms develop to provide coherency to business software applications, service-oriented applications and integration platforms have been introduced to provide development and runtime environments for applications allowing custom system development. Such an enterprise architecture platform is referred to as an "applistructure." An example of an applistructure is NetWeaver®, by SAP corporation of Walldorf, Germany, which is an integrated technology platform, enabling enterprises to run a business on a single, integrated platform that includes both applications and technology. This enterprise architecture is flexible, easily integrated with applications, and built on open standards to ensure future interoperability and broad integration, specifically as this relates to Web services technology. An integrated technology platform combines interoperability and flexibility to support platform-independent Web services, business applications, and standards-based development.

Features and functions of an integrated technology platform may include an interactive development environment, a developer studio to build user interfaces for business applications, security support, persistent layer support, and integrated deployment capabilities. The platform provides software logistics and life-cycle management. Sophisticated change management and transport services support not only the first implementation of an application, but also the continuous changes that result from business or organizational changes, and/or the implementation of additional functions. Comprehensive software logistics for the development, test, and production landscape are prerequisites for continuous enterprise operations.

For deployment, data is stored in a central application server, along with server-based components of the file store. Typically, modifications made to an application are done at the central application server and distributed to the individual clients, each having a resident file manager as well as client application software to interface with the central application running, on the central application server. In such an environment, modifications to the central application server are available to the distributed clients when accessed by the client application. Modifications to the client application are distributed and deployed by the central application server. Each client may create custom and local modifications to the client application software as well, wherein such custom modifications are not sent back to the central application server and are not implemented in the central application operation. When a modification is implemented in the central application server, and possibly also in, the client application, such modification may not be compatible with the custom modifications implemented by the client. In such case, the client is often required to rebuild the custom modifications to work with the modified central application and to work with the modified client application when necessary.

BRIEF DESCRIPTION OF DRAWINGS

FIG. 16 illustrates a user interface for an editor, according to one embodiment.

FIGS. 17A, 17B, 18A, 18B and 19 illustrate various tables used for versioning in a system supporting hot deployment with modification auditing, according to an example embodiment.

DETAILED DESCRIPTION

As the distribution of information and access to common information and applications of clustered computing devices increases, there is a need for application customization and modification of database schema. There is a need to streamline the process and avoid the redundant custom modifications, thereby increasing the flexibility and reliability of the integrated technology platform. In applications using high level languages and software packages, such as a JAVA dictionary, there is a need to allow modifications of database schema using a similar platform.

Methods and apparatus for application modification involve an application modification framework for an integrated technology platform, which allows hot deployment of modifications. In one embodiment, an application modification framework includes a modification component, a hot deployment component, and a package manager component. The framework provides various editors which allow a developer of the base application or a custom client application to edit files and features associated with the application. Managers are provided to control each of the editors and to allow auditing and modification monitoring for maintenance of historical information. Hot deployment controls the ability of the user to implement modifications and changes, wherein changes are identified as to origin and purpose, allowing smart debug to identify if error(s) occurred during custom modification, base modification or otherwise. Additionally, a modification package manager is an administrative tool that manages deployment of modifications. The package manager receives modifications to an application and provides these for deployment of the application with modifications. The package manager audits changes and modifications provided by a client and maintains versioning for these changes.

Figure 1:
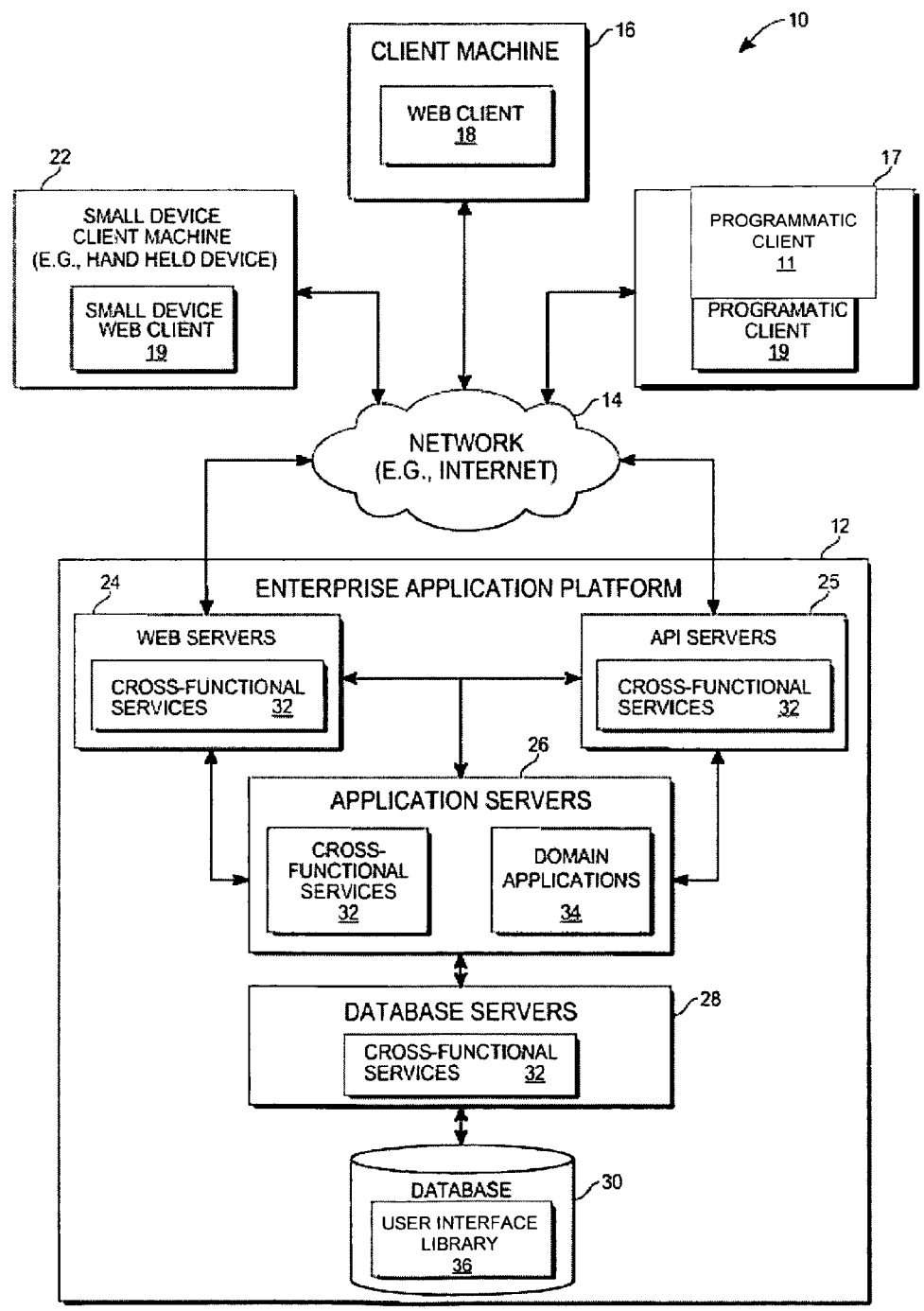
FIG. 1 is a network diagram depicting a system 10, according to one exemplary embodiment, having a client-server architecture.

FIG. 1 is a network diagram depicting a system 10, according to one embodiment, having a client-server architecture. A platform (e.g., machines and software), in the form of an enterprise application platform 12, provides server-side functionality, via a network 14 (e.g., the Internet) to one or more clients. FIG. 1 illustrates, for example, a client machine 16 with web client 18 (e.g., a browser, such as the INTERNET EXPLORER® browser developed by Microsoft Corporation of Redmond, Wash.), a small device client machine 22 with a small device web client 19 (e.g., a browser without a script engine) and a client/server machine 17 with a programmatic client 11.

Turning specifically to the enterprise application platform 12, web servers 24 and Application Program Interface (API) servers 25 are coupled to, and provide web and programmatic interfaces to, application servers 26. The application servers 26 are, in turn, shown to be coupled to one or more database servers 28 that facilitate access to one or more databases 30. The web servers 24, API servers 25, application servers 26, and database servers 28 host cross-functional services 32. The application servers 26 further host domain applications 34.

The cross-functional services 32 provide services to users and processes that utilize the information enterprise application platform 12. For instance, the cross-functional services 32 provide portal services (e.g., web services), database services and connectivity to the domain applications 34 for users that operate the client machine 16, the client/server machine 17, and the small device client machine 22. In addition, the cross-functional services 32 provide an environment for delivering enhancements to existing applications and for integrating third party and legacy applications with existing cross-functional services 32 and domain applications 34. Further, while the system 10 shown in FIG. 1 employs a client-server architecture but other architectures could equally well find application in a distributed, or peer-to-peer, architecture system.

Figure 2:
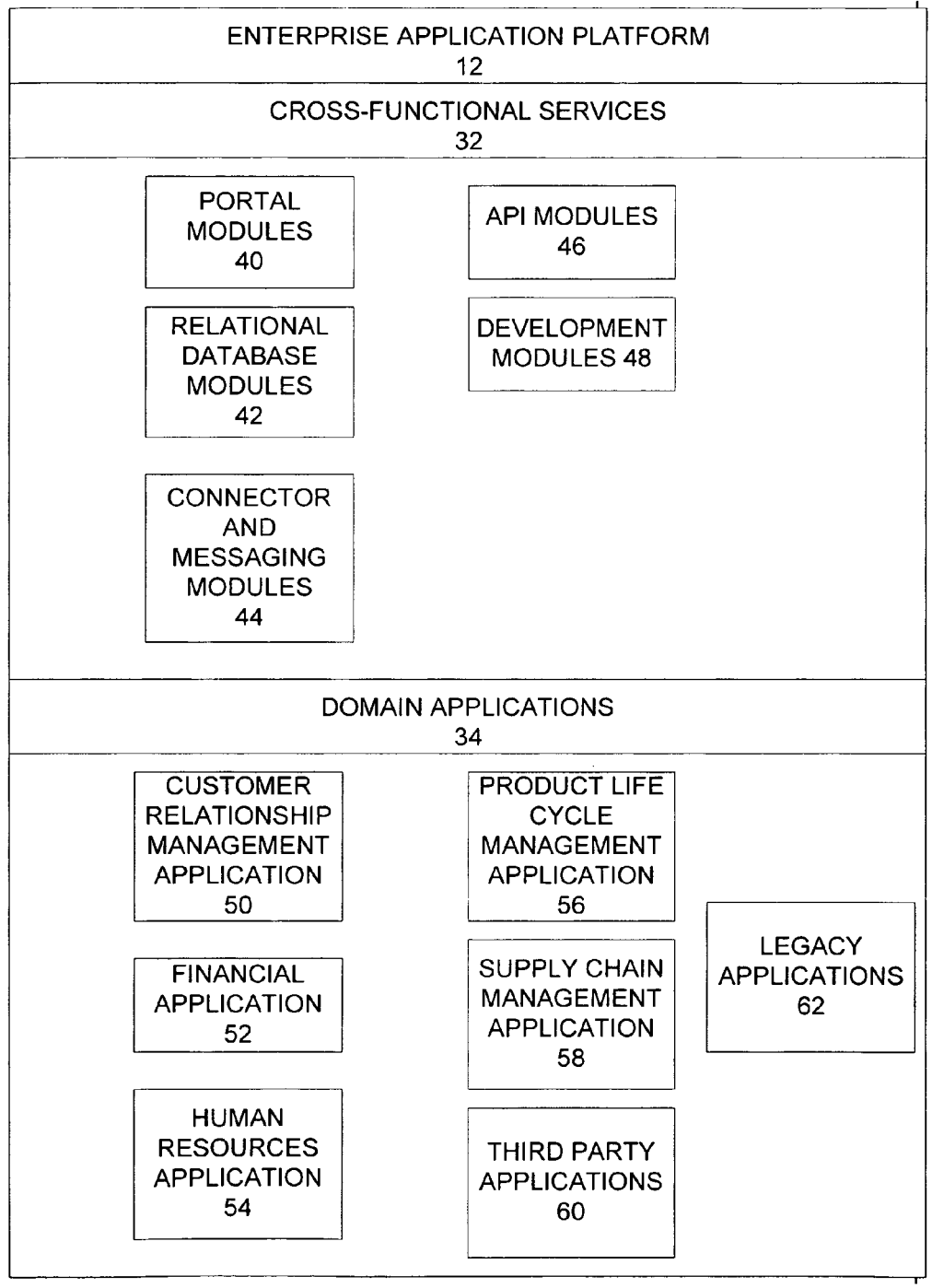
FIG. 2 is a block diagram illustrating enterprise applications and services as embodied in the enterprise application platform 12, according to an exemplary embodiment.

FIG. 2 is a block diagram illustrating enterprise applications and services as embodied in the enterprise application platform 12, according to an exemplary embodiment. The enterprise application platform 12 includes cross-functional services 32 and domain applications 34. The cross-functional services 32 include portal modules 40, relational database modules 42, connector and messaging modules 44, API modules 46, and development modules 48.

The portal modules 40 enable a single point of access to other cross-functional services 32, and domain applications 34 for the client machine 16, the small device client machine 22 and the client/server machine 17. The portal modules 40 are utilized to process, author, and maintain web pages that present content (e.g., user interface elements and navigational controls) to the user. In addition, the portal modules 40 enable user roles, a construct that associates a role with a specialized environment that is utilized, within a defined scope, by a user to execute tasks, utilize services and exchange information with other users and. For example, the role determines the content that is available to the user and the activities that the user may perform. The portal modules 40 include a generation module, a communication module, a receiving module and a regenerating module (not shown). In addition, the portal modules 40 comply with web services standards and/or utilize a variety of Internet technologies including JAVA, J2EE, SAP's Advanced Business Application Programming Language (JAVA) and Web Dynpro, Extensible Markup Language (XML), JAVA Cryptography Architecture (JCA), JAVA Authentication and Authorization Service (JAAS), a cryptographic standard for Public Key Infrastructure (PKI) such as X.509, Lightweight Directory Access Protocol (LDAP), Web Service Definition Language (WSDL), WebSphere Service Registry and Repository (WSRR), Simple Object Access Protocol (SOAP), Universal Description, Discovery and Integration (UDDI), and Microsoft .NET.

The relational database modules 42 provide support services for access to the database 30 that includes a user interface library 36. The relational database modules 42 provide support for object relational mapping, database independence and distributed computing. The relational database modules 42 are utilized to add, delete, update and manage database elements. In addition, the relational database modules 42 comply with database standards and/or utilize a variety of database technologies including Structured Query Language (SQL), SQL DataBase Connectivity (SQLDBC), Oracle enterprise solutions, MySQL database solutions, Unicode standards for text representation, and JAVA Database Connectivity (JDBC).

The connector and messaging modules 44 enable communication across different types of messaging systems that are utilized by the cross-functional services 32 and the domain applications 34 by providing a common messaging application processing interface. The connector and messaging modules 44 enable asynchronous communication on the enterprise application platform 12.

The API modules 46 enable the development of service-based applications by exposing an interface to existing and new applications as services. Repositories are included in the platform as a central place to find available services when building applications.

The development modules 48 provide a development environment for the addition, integration, updating and extension of software components on the enterprise application platform 12 without impacting existing cross-functional services 32 and domain applications 34.

Turning to the domain applications 34, the customer relationship management applications 50 enable access to, and facilitate collecting and storing of relevant personalized information from, multiple data sources and business processes.

The third party applications 60, as well as legacy applications 62, may be integrated with domain applications 34 and utilize cross-functional services 32 on the enterprise application platform 12. The enterprise application platform includes application servers 26, FIG. 1, which store application software and applications used by client machines 16, 17, 22 and others.

Figure 3:
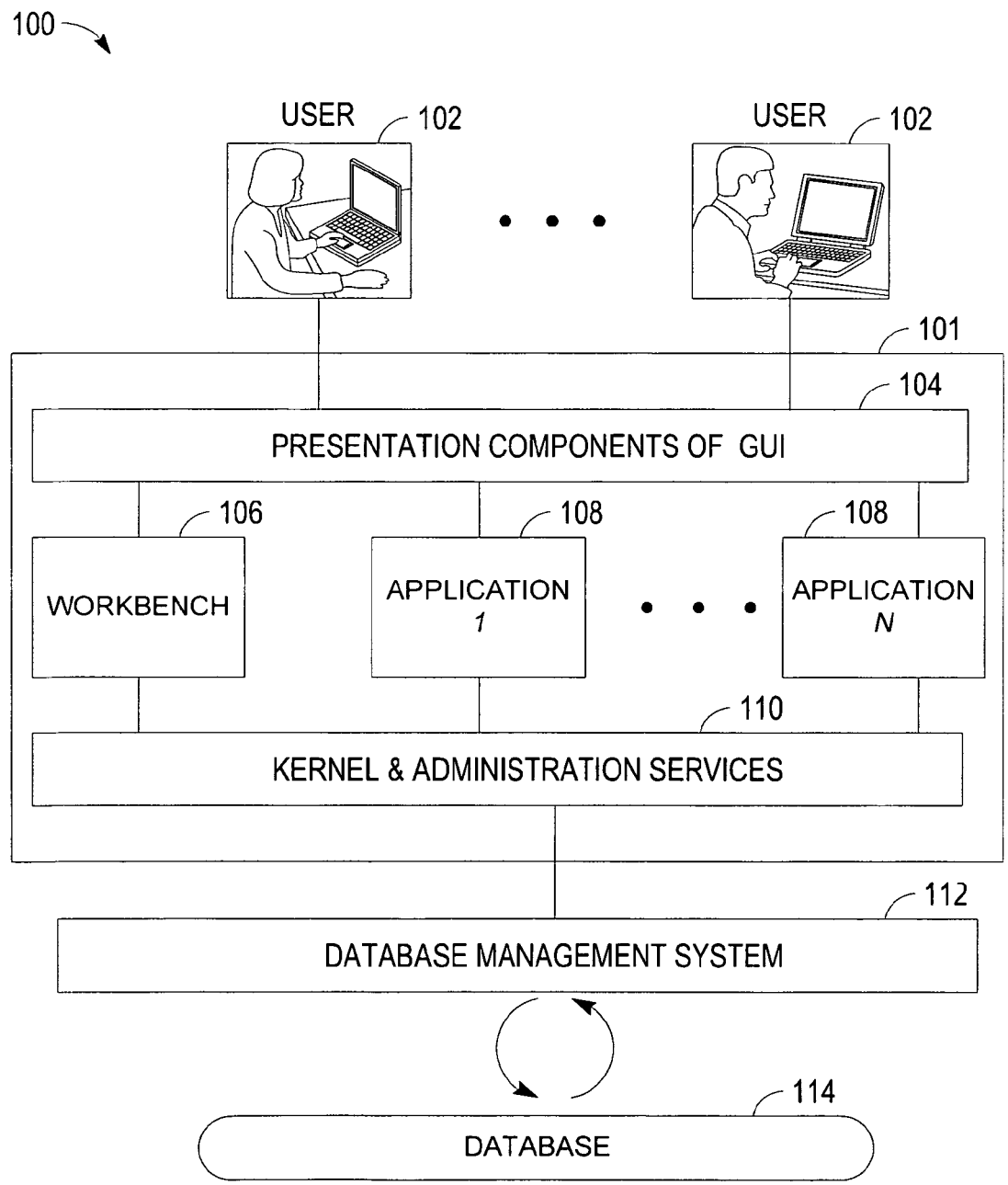
FIG. 3 illustrates a logical view of the interactions of the various components within system 10, according to an embodiment.

FIG. 3 illustrates a logical view of the interactions of the various components within system 10. In one example, a programming language is provided to build and modify applications contained within application servers 26, FIG. 1, and is referred to as JAVA. The system 100 of FIG. 3 corresponds to enterprise application platform 12 and illustrates a logical view of an example use of JAVA in designing a system. One difference in presenting a logical view rather than a hardware-oriented or software-oriented view is that components are not always assigned to a particular hardware or software unit.

As illustrated in FIG. 3, system 100 is accessible by multiple users 102, which interface with presentation components of Graphical User Interface (GUI) 104, which communicate with JAVA workbench 106 and one or more JAVA applications 108. Further a kernel and administration services unit 110 communicates with the JAVA components 106, 108, as well as database management system 112. The database management system 112 is tasked with interfacing with and controlling database 114, in which application data and files are stored.

Various tasks are associated with the logical components 101, according to an example embodiment. The kernel and administration services component 110 is a runtime environment for applications, which is agnostic to hardware, operating system, and database type, organization and function. In the present example, the environment is a JAVA environment. A runtime environment may be written in a combination of languages. The kernel may be created from a low level language, C or C++. Functionality building upon this kernel is conveniently created in C, C++ or Java itself Kernel and administration services component 110 is responsible for running application, managing user and process administration, and accessing databases. Within components 110, applications run on software processors, referred to as virtual machines.

Component 110 is responsible for the tasks that are typically delegated to an operating system. JAVA is a multi-user environment, wherein each user is able to run several independent applications. For example, users log on to an application server to run applications. In this way, users do not directly contact the actual operating system of the host. In this way, an application server is the only user of a host operating system.

As illustrated in FIG. 3, logical components 101 are linked to a database system, consisting of a database management system (DBMS) 112 and a database 114. Rather than having applications communicate directly with database 114, applications, such as JAVA applications 1 to n, 108, use kernel and administration services component 101. Additionally, JAVA applications 1 to n, 108, are configured to communicate with and are accessible from external systems.

Kernel and administration services component 110 also provides control and administration of applications, specifically of the enterprise application platform 12. Component 110 includes programs that allow a user to monitor and control applications at runtime and that allow a user to change runtime parameters.

Logical components 101 further include a workbench component 106, such as a JAVA workbench, to enable a development environment for applications, such as development using the JAVA language. The workbench component 106 allows a user to create, edit, test, and organize application programs. In one example, the workbench component 106 is written in JAVA.

GUI presentation components of the GUI 104 are responsible for interaction between the applications and user input and output (I/O), as well as for desktop component integration, such as word processing and spreadsheets, into the server application for the enterprise application platform 12.

Figure 4:
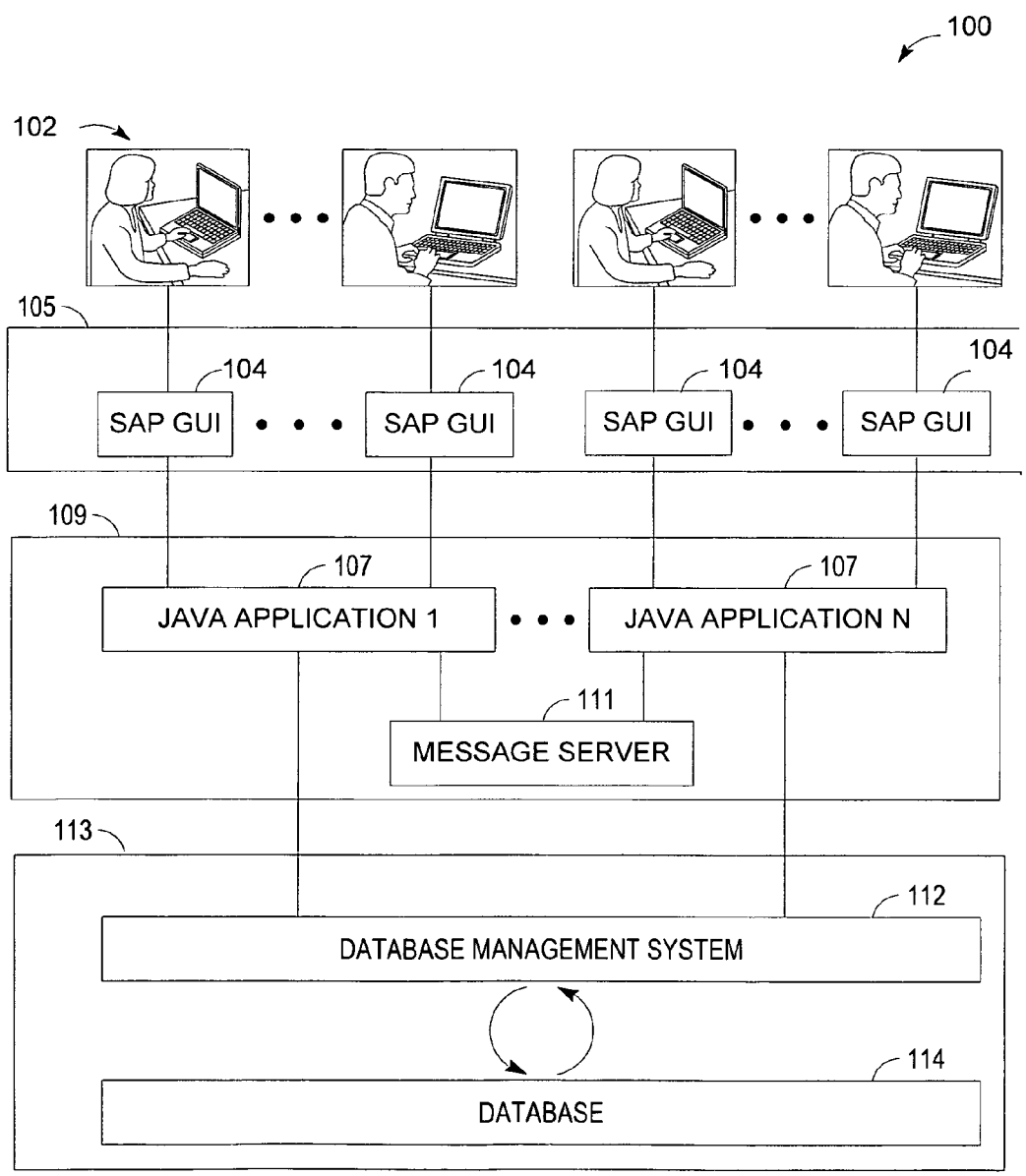
FIG. 4 illustrates a software-oriented view of interactions of the various components within system 10, according to an embodiment.

FIG. 4 illustrates a software-oriented view of interactions of the various components within system 10. In one example, an JAVA-based system 100, such as NetWeaver, comprises GUI components 104, such as SAP GUI components, and JAVA application servers 107. System 100, which may also correspond to enterprise application platform 12, is a multi-tier client/server system. The individual software components are arranged in tiers and function as a client for the components below them, depending on their position. Further the individual software components may function as a server for the components above them. The illustrated configuration of FIG. 4 includes various software layers. A database layer 113 is accessed by an application server and is made up of database management system 112 and database 114.

The database 114 stores master data and transaction data from client application programs, and data for the application server and JAVA as well. For example, database 114 contains application programs and the control and customizing data for such application programs. A special part of the database 114, referred to as the repository, stores objects including program texts, screen definitions, menus, function modules, and other elements. Repository objects are available in the JAVA workbench 106.

Various software components of the application layer 109 include one or more application servers 107 and a message server 111. Each application server 107 contains a set of services used to run applications within the enterprise application platform 12. While it is possible to use one application server 107 to run an enterprise application service, it is typical to have services are distributed across more than one application server 107. This means that not all application servers 107 will provide the full range of services. The message server 111 is responsible for communication between the application servers 107. It passes requests from one application server to another. The message server 111 also contains information about application server groups and the current load balancing within them. This information is used to choose an appropriate server when a user logs onto the system.

The presentation layer 105 is the interface between the system 100 and users or clients. Various GUI software components 104 provide intuitive graphical interface for entering and displaying data. Presentation layer 105 sends user inputs to the application server(s) 107, and receives display data from the application server(s) 107. While a GUI component 104 is running, it may remain linked to a user's terminal session. A software-oriented view, such as illustrated in FIG. 4, can be expanded to include further layers, such as an Internet Transaction Server (ITS).

The software-oriented view may be accomplished with various hardware configurations. There are many different hardware configuration possibilities for logical layers 105, 109 and 113, as well as for the various components therein. In one example, distributed layers reside on a single host; in another example, the system 100 includes one host for each logical layer. Distribution of database components within database layer 113 may be configured according to the database 114 and the database management system 112 used. The application layer 109 and presentation layer 105 components can be distributed across any number of hosts. It is also possible to install more than one application server 107 on a single host. A common configuration is to run the database system 112 and a single application server 107, which may contain special database services, on one host, and to run each further application server 107 on a separate host. The presentation layer 105 includes components that may run on client machines, such as user desktop computers.

Figure 5:
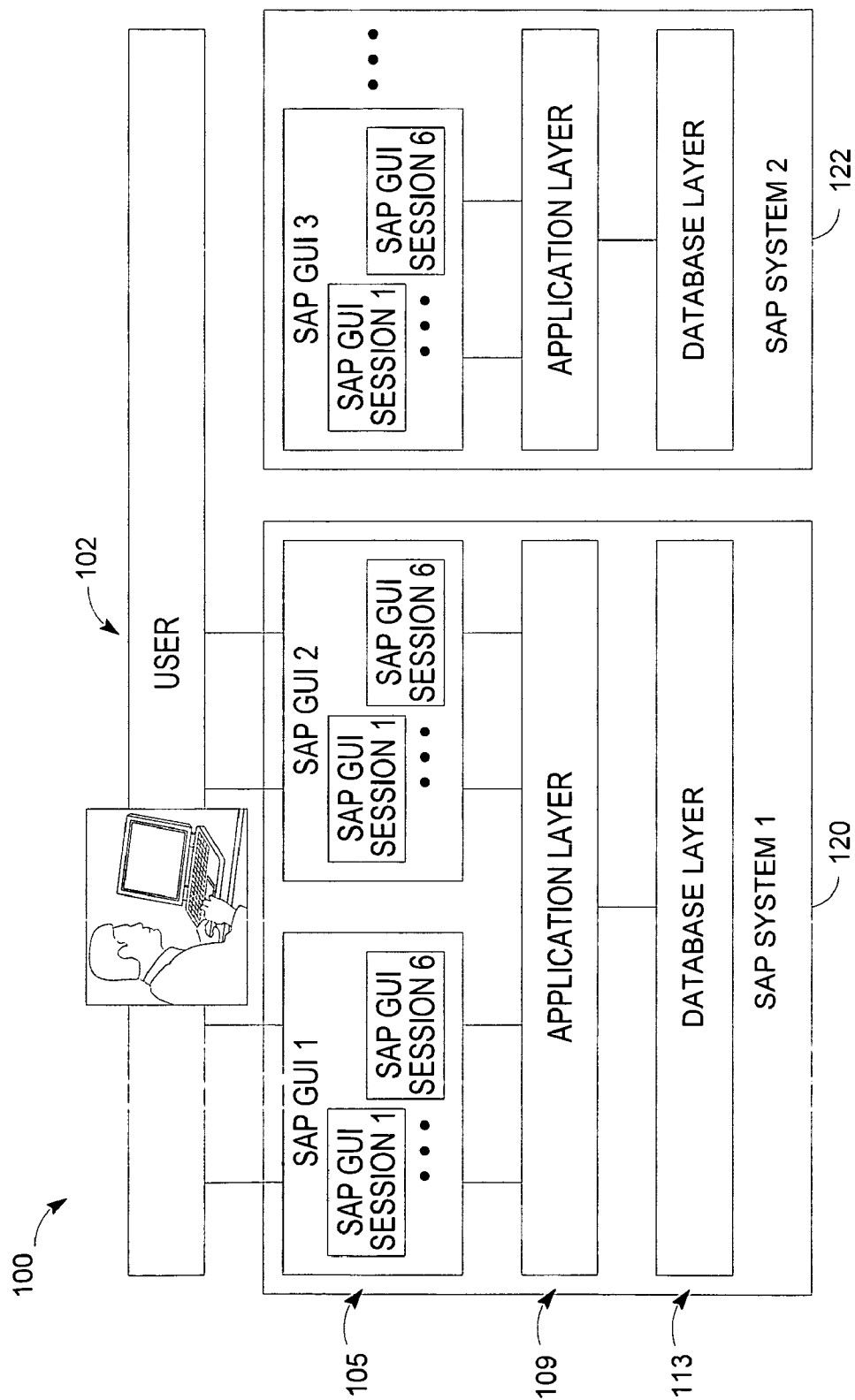
FIG. 5 illustrates an example embodiment of a system configuration from a user perspective, according to an embodiment.

FIG. 5 illustrates the system 100 from a user perspective. Here user 102 interfaces with presentation layer 105 to access application layer 109 and database layer 113. As illustrated, multiple application systems, 120, 122, are available to user 102. Any number of users 102 may have a similar user perspective, wherein components visible to user(s) 102 appear as a window on a client machine display created by the presentation layer 105.

In one example, user 102 starts a GUI utility installed on the front end and then logs onto the system 100. During the start up and log on operations, user 102 chooses an available one of systems 120, 122. The systems 120, 122 are shown for illustrative purposes, and there may be any number of systems accessible by user 102. Additionally, a system 120, 122 may be accessed by multiple users 102 concurrently, and similarly, a user 102 may access multiple systems 120, 122 concurrently. Also, systems 120, 122 may interact with each other, and such interaction may be at the direction of or incurred by actions of user 102. The user 102 then connects to the message server 111 in the selected system 120, 122 and obtains the address of an application server 107.

GUI component(s) 104 of presentation layer 105 create a logon screen for display by user 102 at a client machine. Once user 102 has successfully logged on, component(s) 104 initiate display of the initial system screen at the user 102 client machine. Each window is represented as a session. After logging on, the user can open multiple further sessions using a GUI component 104, wherein each session presents as an independent application. The various sessions allow user 102 to run different applications in parallel, independently of one another.

Within a session, user 102 may run applications which call further windows, such as dialog boxes and graphic windows. These windows are not independent as they belong to the session from which they were called and can be either modal (the original window is not ready for input) or amodal (both windows are ready for input and interact with each other).

User 102 is able to open other GUI component(s) 104 to log onto the same system, 120, 122, or another system, 120, 122. The individual GUI component(s) 104, as well as corresponding terminal session(s) of user 102, are independent, wherein user 102 may have GUI components 104 representing the presentation layers 105 of several systems, 120, 122, open on a user 102 desktop computer.

Figure 6:
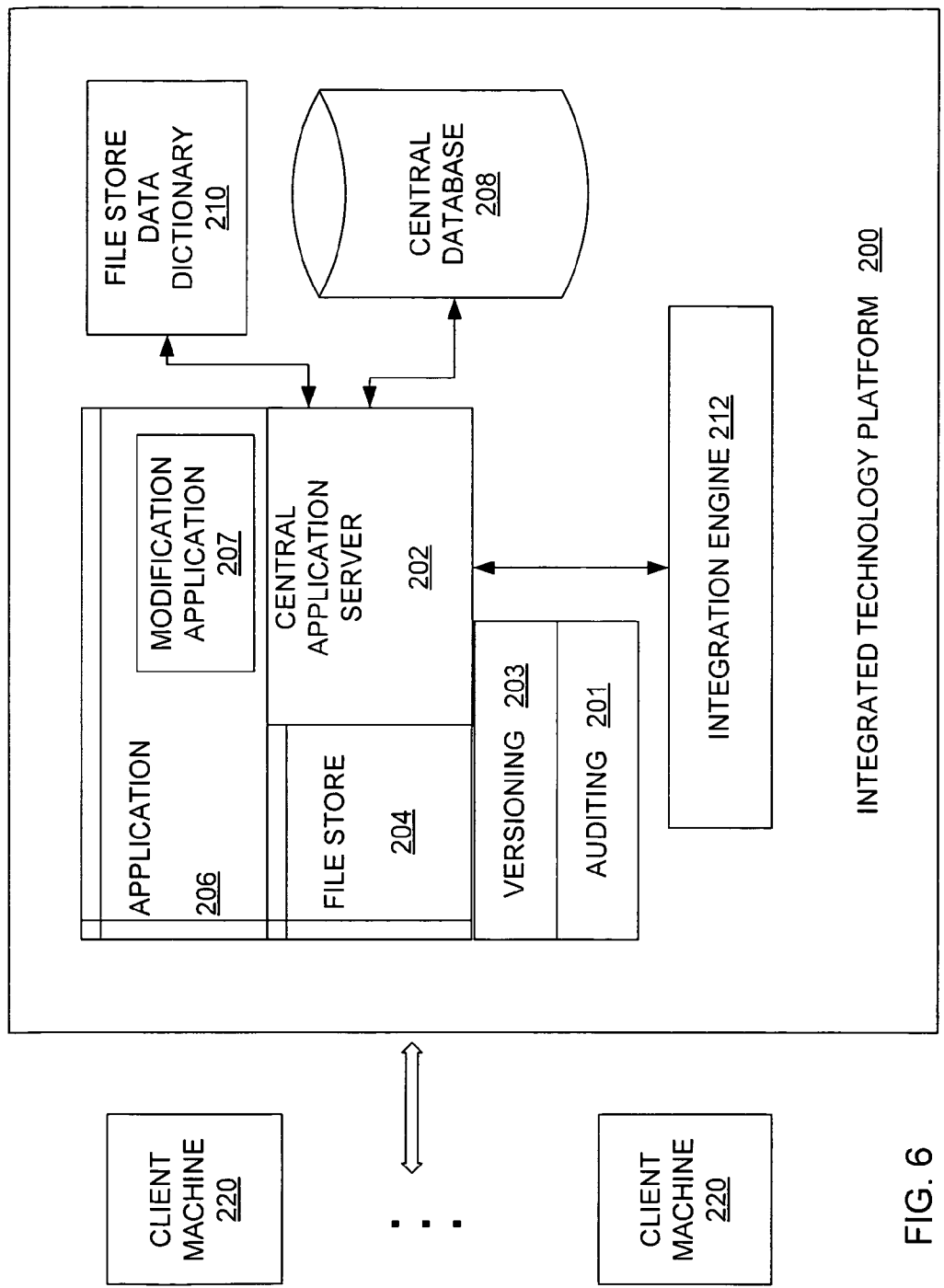
FIG. 6 illustrates an example embodiment of a system configuration including an integrated technology platform, according to an embodiment.

FIG. 6 illustrates an example embodiment of a system configuration including an integrated technology platform 200, such as to implement an enterprise application platform 12 of FIG. 1. Integrated technology platform 200 includes an integration engine 212. Integration provides process-centric collaboration and better understanding of the impact of individual users and sessions on each other as well as on other services. Users 102 are part of system 100, such as illustrated in FIG. 3, which is a computing network that may be implemented as a Local Area Network (LAN) or other configuration of computing devices which access system 100 through a network. System 100 may be accessible to users 102 by way of a variety of computing and communication devices. System 100 may further include a router, processing communications for multiple computing and communication devices, and other enterprise networks. The system configuration of FIG. 6 is a cluster environment, wherein a group of loosely coupled computers work together closely and in this case have a common central application server.

Figure 7:
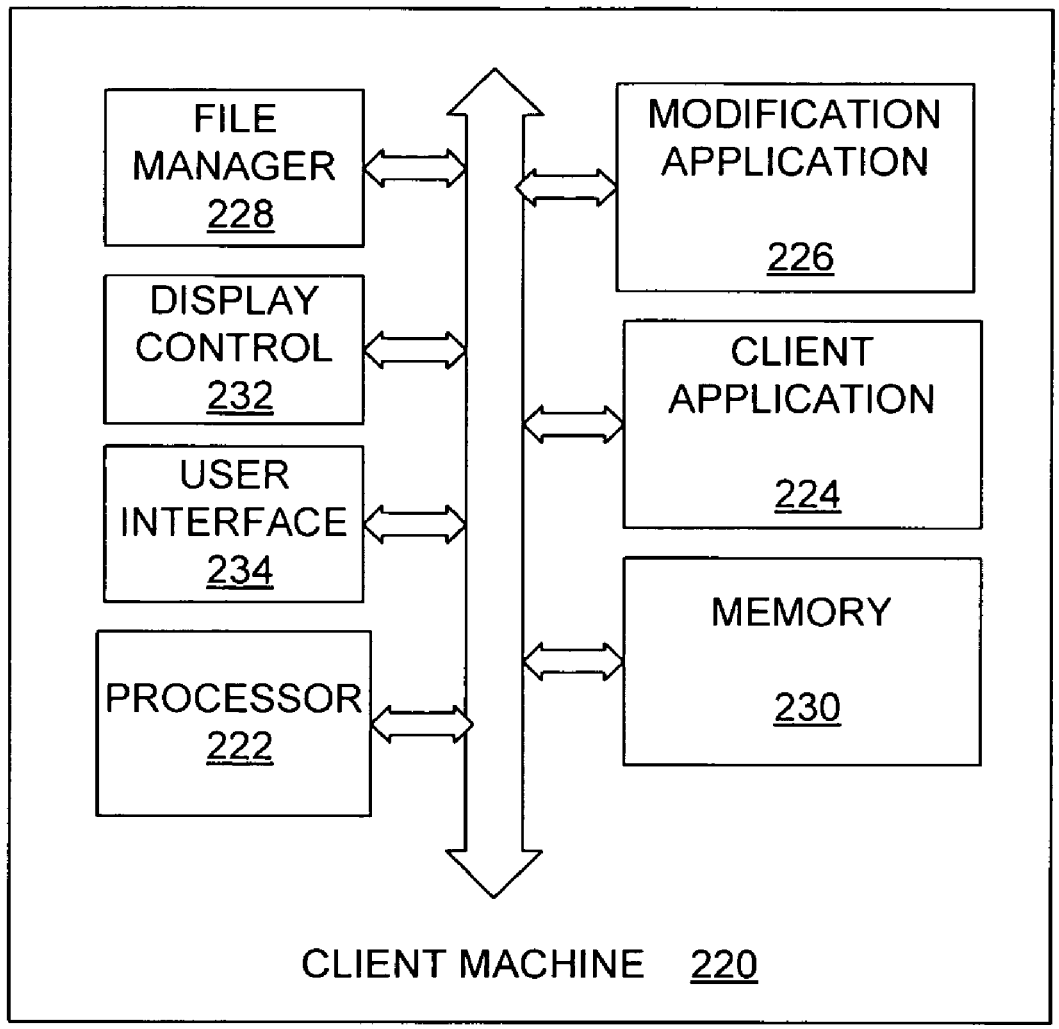
FIG. 7 illustrates a client machine, according to an example embodiment.

In one example, a system configuration as in FIG. 6 may include client machine 220 accessed by a user 102, wherein the client machine 220 as illustrated in FIG. 7. The client machine 220 is a computer or other computing device. The client machine 220 includes a processor 222, a memory 230, a file manager 228, a client application 224 corresponding to a central server application, and a modification application 226 for implementing custom modifications and receiving modifications to client application 224. In one embodiment, modification application 226 is for implementing custom modifications, while client application 224 is tasked with receiving modifications from external systems, such as system 120, 122 of FIG. 5. Additionally, client machine 220 includes user interface 234 for interaction with user 102. User interface 234 may be included within client machine 220 or may be a separate unit in communication with client machine 220. User interface 234 communicates with a display device (not shown), which is controlled by display control 232 to provide a visual or audio display of data and information, as well as reports and other information and statistics generated there from. User interface 234 may include software to communicate messages between system 120, 122 and user 102. User 102 may interface with system 120, 122 through client machine 220 to develop services, perform maintenance on services, obtain reports and accounting information, and otherwise interact with system 120, 122.

Continuing with FIG. 6, one or multiple client machine(s) 220 operate to interface with integrated technology platform 200, which further includes a central application server 202, a file store data dictionary 204, application 206, file store dictionary 210 and a central database 208. Application 206 includes software for one or more applications. In addition, application 206 includes central modification application 207, which includes instructions for implementing modifications to application 206. In one embodiment file store data dictionary 204 is a data dictionary describing the application schema. A data dictionary contains a description of how objects are stored in the central database 208. A file store table in the central database 208 stores the objects.

Application 206 enables user 102 to invoke and develop within a "sandbox" environment, which involves fairly complex, free-form exploration and experimentation. A sandbox is a testing environment, which may be a virtual environment, to isolate untested modification, such as code changes, and to allow experimentation from a production environment or repository. A sandbox allows a user to access features, services and applications that are used in operation and modify or experiment without impacting live operation. A sandbox may be used for software development, web development, revision control, and development of services, including web-based editing environments such as wikis.

Sandboxing protects "live" servers and data, source code distributions and other collections of code, data and/or content from changes that could be damaging or difficult to back out of. Sandboxes replicate at least the minimal functionality needed to test services and applications or other code under development. For example, a sandbox allows a user to access environment variables and databases used by a stable implementation.

Application 206 may be used to implement a Strategy Management (SM) application, or other application developed in a high level computing language, such as JAVA. Data for application 206 is stored in file store data dictionary 204 and central database 208. In this example, central database 208 is a relational database associated with application server(s) 104 of the deployment location. Modification application 207 is used to modify services, features and applications of application 206, and implements a modification environment. Modification application 207 may implement modifications made by a system administrator for integrated technology platform 200. Modifications are then delivered to client machine(s) 102 by a "hot fix" or "fix pack." A hot fix implements the modification into client application 224 by implementing the modifications into source code.

Modifications may impact components at integrated technology platform 200, client machine 220, or both. At client machine 220, modifications are implemented by modification application 226 for inclusion in source code, or otherwise, of client application 224. Application 206 uses a transport utility to deliver modifications to client machine 220. For custom modifications made by user 102 at client machine 220, client application 224 uses a corresponding transport utility for migrating modifications. A modification includes a software application change, and may include data moved from a development environment to a quality assurance and verification environment or to a production environment.

In one example, modifications to application 206 are delivered as a hot fix to a client machine 220 in the form of a hot fix package or fix pack. Client machine 220 installs the hot fix, or fix pack, in client application 224, such as a customer development module, using modification application 207, also referred to as a package manager.

The hot deployment process is a service which distributes client modifications to application deployment locations of an operating system. In one example, a computing device within a network provides modifications to a server-based operating system. The server-based operating system may be one such as a NetWeaver® system provided by SAP corp. The modifications are received and then implemented during operation of the server-based central operating system. Once received from the client, the modifications are stored in the internal file store data dictionary 204 as in FIG. 6. From the internal file store data dictionary 204 the modifications are provided to a central application server 202, application deployment locations on the operating system.

A hot deployment process may be implemented in an application server cluster environment, wherein a central operating system provides information and makes applications available to a cluster of distributed client devices. Client devices may include other application servers as well as databases and other enterprise components and processing devices. Hot deployment may be defined as a process of deploying at "runtime" any of various modifications to the application server programs. The modifications may come from a variety of sources, including client machines connected through a distributed network, or otherwise having access to the application server of the central operating system. Hot deployment allows such modifications to be made to the application program without requiring the application program to be reinstalled or the application server to be restarted. In this way, hot deployment avoids shutting down the application server; and does not require the application program to be rebuilt, recompiled, repackaged, reinstalled or otherwise redeployed.

Hot deployment allows a client to make modifications to the base application, as well as other modified versions of the application, and provide the modifications to the central operating system for implementation into the source code of the application. The client does this without having extensive access to the base application source code. The central operating system implements the modifications without interrupting the application program's current status, and thus avoid interrupting any of the distributed clients currently using or running the application program. In a business environment, many clients access common resources and applications, wherein interruptions to the common resources and applications can incur dramatic delays and latency to business operations. Hot deployment adds flexibility to business functions while avoiding such delays and latency.

Modifications may be audited by modification application 207 or other component within, in communication with, or having access to integrated technology platform 200. Auditing is also done for custom modifications implemented by modification application 226. In one example, the integrated technology platform 200 uses an auditing function to resolve customer problems and troubleshooting. The auditing function allows isolation of error location in either application 206 or client application 224, and specifically, whether the error occurred in modifications delivered to client machine 220 or in custom modifications made at client machine 220. An auditing module 201 is provided to implement auditing functions. In providing the auditing functions, the auditing module 201 accesses both a base application and a client application. The base application is the application as originally provided by a service from an integrated technology platform 200 to a client machine. The client application is a set of modifications provided to the service, and may be provided as the base application with client modifications. The auditing module 201 includes routines and rules for identifying how modifications are implemented in the base application.

In an example embodiment, such application modification and auditing involves an integrated technology platform running integration applications, a development utility and a file manager. In one example, the integrated technology platform is NetWeaver, the development utility is for developing a custom data dictionary, and the file manager is a tool for editing source code, such as an SM file manager plug-in.

Similarly, integrated technology platform 200 includes versioning unit 203 which records each modification received, such as a software patch, and each modified application program and assigns a version number. Versioning unit 203 allows each patch and each version of the application program to be retrieved and evaluated. In case a modification is recalled, and to be removed from the application program, the versioning allows the system to retrieve an earlier version of the application program which does not contain the modification. The earlier version is then hot deployed, or the modification is removed using a hot deployment process. The adaptation of the application program to resolved problems thus introduces little to no interruption to users of the application program. Similarly, versioning unit 203 works with auditing unit 201 in troubleshooting and problem solving. When problems are identified, the auditing unit 201 allows the client to identify a version or point of operation of an application program when the problem did not occur. The client is then able to return to that point and correct the problem.

Modifications may involve components, including but not limited to, data dictionary, strings, custom string translation, name queries, source code and binary code. User 102 is able to create a custom data dictionary and use the modification application 226 to implement modifications thereto. User 102 may further modify existing strings and create custom strings, as well as create custom named queries. A named query is a preprogrammed query to retrieve a specific type of information. For example, a query may search through a database to find records relating to a specific process or keyword. Boolean logic or natural language techniques may govern the way the search is performed as well as the interface for entering search terms. Named queries are identified by a name or other identifier for use. Clients may modify a named query to make the query specific to their application. Similarly, clients may add new named queries, which are then referred to as custom queries or custom named queries.

With respect to source code, user 102 is able to create or modify *.htm, *.js, *.css, *.jsp, *.<image> files, (the character "*" is used here as a wildcard). Application modification and auditing allows implementation of custom modifications to aspects of an integrated technology platform 200 or other service or application. The methods and apparatus disclosed herein enable efficient hot fixes to application components, including hot fixes to JAVA based components.

As discussed hereinabove, in conventional integrated enterprise systems, modifications required reinstalling the application or restarting the application server, or other interruption to the current status of the application. Such interruption disrupts the flow of information and communication among business clients. Hot deployment allows enterprise application platform 12 or integrated development platform 200 to make certain application modifications without redeploying an application. In one example, JAVA Platform, Enterprise Edition or JAVA EE modifications traditionally involve redeployment of the application. JAVA EE is a widely used platform for server programming in JAVA programming language, and includes libraries to provide functionality to deploy distributed, multi-tier JAVA software to run on an application server.

Redeployment is costly, both in time and resources, involving revising source code, distributing source code, recompiling source code and re-implementing custom modifications. As discussed herein, by providing modification applications 207 and 224, a modification framework is created to allow incremental patching or updating of application modules and 206 and 224, in real time operation eliminating the need to redeploy an entire application.

Figure 8:
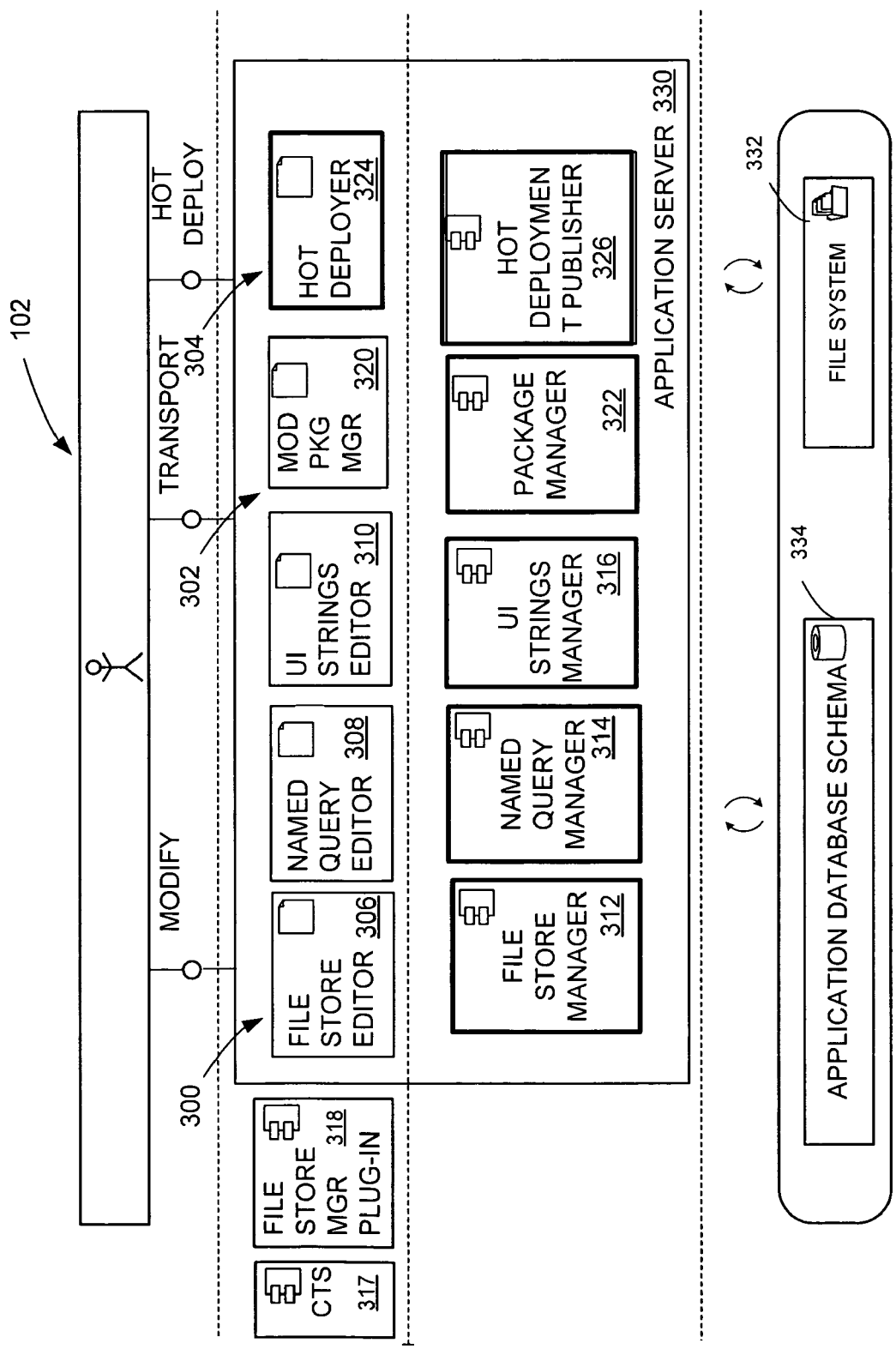
FIG. 8 illustrates an application modification framework, according to an example embodiment.

A modification framework for application 206 or client application 224 is illustrated in FIG. 8 and is made up of at least three components: modification module 300, transport module 302 and hot deployment module 304. Modification module 300 includes file store editor 306, named query editor 308, User Interface (UI) string editor 310, file store manager 312, named query manager 314, and UI strings manager 316. Additionally, modification module 300 uses a file store manager plug-in 318, such as an Eclipse plug-in. Transport module 302 implements change packaging and cross-server transport, including a modification package manager 320 (labeled MOD PKG MGR 320 in FIG. 8) and a package manager 322. Hot deployment module 304 includes hot deployer 324 and hot deployment publisher 326. The modification module 300, transport module 302 and hot deployment module 304 are included within application server 330. In one example, an integrated enterprise solution NetWeaver an application server is implemented as NetWeaver Composition Environment (NWCE) for J2EE applications.

Package manager 322 and hot deployment module 304 may employ one of various techniques for implementing modifications and additions to an application operating at application servers 26. One example process replaces files and data related to the application program that are used during execution of the application program. For files and data, such as class files or *.jar files in Java, the new or modified files and data replace existing files and data. In this way, next time the files or data are accessed in execution of the application program, the application program uses the new files and data. When the existing files are currently in use in execution of the application program, the application program continues to use the existing files. This is the case where the files include code for routines, procedures, and so forth are running, but the client has sent modifications or additions in the form of new files. After completion of the routines, procedures, and so forth, the package manager 322 and the hot deployment module 304 replace the existing files with the new files. At next execution the new files are used. This does not require the application program to restart, reinitialize or otherwise change to incorporate the new files.

Additionally, in one embodiment, a position is marked in the execution code for the application program whereupon a new file or new data is implemented during execution of the application program. Further, there may be positions, such as breakpoints, which are included in the application program or files or data, whereupon at each breakpoint occurrence the package manager 302 or the hot deployment module 304 checks for modifications or additions. The breakpoint may be added by a developer, and allows adaptive application of modifications to operation of the application program.

In one embodiment, an integrated technology platform uses JAVA language for application development. JAVA is a programming language for creating applications on business and enterprise applications and systems. JAVA allows application deployment on a currently running system in real time. A Change and Transport System (CTS) 317 can move applications from a development environment to a quality assurance environment to production machines. While CTS 317 and such improvements have allowed the use of non-JAVA code, modification of specific components, such as JAVA EE code, is not straightforward. CTS 317 has a separate interface to receive information from client machines. CTS 317 receives modifications or other information as a package. CTS 317 provides the received package to another system for processing. In the example illustrated, CTS 317 provides the package to package manager 322. CTS 317 acts as a selection mechanism or filter for changes to transport into the application as modifications, including additions to an application program.

As an example, a JAVA EE application is static, requiring standardized deployment format (*.ear or *.war), thereby creating a challenge in modifying such applications once deployed. Traditionally, an expertise and an in-depth knowledge of the specific application structure is required for continued development. Also, in a system requiring a standardized deployment format, it becomes difficult to incrementally patch or update application modules at real time without redeploying the entire application.

Application modification, as presented herein, provides a robust, generic application modification framework allowing customers to modify each application layer without in-depth understanding of application structure or accessing source code.

Still further, such application modification provides a real time solution to transport and deploy application changes with fine granularities without redeploying an entire application. A reduction in application maintenance and more time efficient upgrades result in improved productivity. The package manager 322 selects various criteria to store, including modification type, modification date range, file path pattern and owner of the modification. The modification type indicates what part of the application is modified, for example a named query, UI strings, web page information, JAVA classes, JAVA Archive, etc. This is a way to group resources or changes for implementation and later identification.

In one example, the client provides modifications as incremental patches. Hot deployment allows incremental upgrading and modifying of an application program using such incremental patches without disruption to, or interruption of, application program processing. As each patch or modification is received and implemented, the specifics are recorded, versioned and audited. When an issue or error arises after implementation of a patch or modification, the patches may be evaluated to identify a cause of the issue or error. For example, if multiple patches are implemented and then a system error occurs or the application fails to run as expected at the client machine, troubleshooting will first seek to identify a cause of the problem. The problem may result from a patch or modification, or the problem may result from a problem in the base application program. To troubleshoot, it is possible to consider each patch in isolation and as part of the application program. Each patch may be rolled back to resume a state of the application existing prior to implementation of the modification. In this way, a cause of the problem is better identified. A variety of techniques are possible for detecting and resolving problems in the application program. All of these are facilitated by auditing, versioning and the ability to recall hot deployed patches. When modifications are made incrementally, it is possible to roll back small changes and provide incremental or fine granularity insight into the problem. Auditing is therefore possible at a granularity introduced by the incremental modifications.

A sandbox development environment for applications, such as JAVA applications, allows development and experimentation without accessing operating file system storage, such as within file system 332. Many enterprise solutions do not support modification of applications by replacing files in an operating system file system, and therefore, any attempt to replace files results in lost modifications on redeployment. In the present example, a modification is "memorized" meaning that the modification is retained in later releases. For example, in a NetWeaver application, modifications are memorized when the entire application is redeployed.

Incremental patching or updating of application modules is implemented without destruction of a base application previously deployed. A "switch" mechanism is provided to switch back or revert to a base application. The base application may refer to any previous version of the application. For example, when a new program is first introduced, the program is the base application. The author of the base application later provides revisions and modified versions, wherein at a given point in time, one of these may now be considered the base application. Effectively, identification of a base application allows a reference point, or time at which performance and operation of the application program is understood. For example, NetWeaver Strategy Management, version 7.5. It may be desirable to return to the base application, for example when several modifications are provided after which a problem results. A base application may be the software purchased by a customer. This could provide great help in identifying a bug source for a customized application.

According to an example embodiment, a database repository, file store data dictionary 204 of FIG. 6, is created as a workaround to a standardized deployment archive, such as for a JAVA EE deployed version. Various application components, including SQL queries, resource bundles and web pages (including Java Server Page (JSP), HyperText Markup Language (HTML), JAVAscript, Cascading Style Sheets (CSSxs) and images), are externalized, uploaded into file store data dictionary 204 and then modified through modification module 300, which provides user 102 with a set of operating file system-like APIs to access, modify and upload content in file store data dictionary 204. In combination with a dictionary, modulation module 300 provides user 102 or other developer a framework to modify various layers of a web application without in-depth understanding of application structure.

Modifications in local file store data dictionary 204 are then packed by package manager module 302 with different granularities according to a broad range of selection criteria. The packed modifications are then transported into remote quality assurance or production file store data dictionary 204 for further deployment. Structured Query Language (SQL) queries and resource bundles are imported into database repository and are utilized by an application at a next request. Web page modifications in file store data dictionary 204 are "hot deployed" to corresponding deployment locations in a server file system 332 by hot deploy module 304, and hot deployment publisher 326, specifically. Hot deployment publisher 326 allows finer granularity and operates to provide security to the cluster of client machines 220.

In one example, JAVA patches, including JAVA class files and JAVA ARchive files, can be packed by package manager 322, transported to remove file store data dictionary 204, and hot fixed or "hot patched" to a deployment location in server file system 332 in a cluster safe manner.

Since modifications are persistent in a database repository, file store data dictionary 204, custom modification is implemented by hot deployment publisher 326. In this way, changes are "memorized."

By separating delivered modifications from a central server from custom modifications, a flexible mechanism enhances development. Base applications, as delivered to client machines 220, are persistent in file store data dictionary 204 and are not overwritten by custom changes and modifications. Application modification is then seamless, as is switching to a base application while debugging a custom modified application. Additionally, the present application modification techniques are applicable to custom web page versioning, modification, transport, deploy auditing and deploy security.

Application modification processes involve various system participants and users, including software developers, both at the central application server or enterprise system and at the client site. A client site is also referred to as a client machine or a node in an enterprise system. Other users include consultants, quality assurance engineers, software developers, release engineers, and application administrators.

A role-based authorization model is a pre-requirement for using an application modification framework. Such a model includes source modification permission processing, wherein users are preapproved for source modification permissions to gain access to modification module 300. Additionally, data transfer permission processing is established, wherein users are preapproved for package permissions to gain access to package manager 302 for building a modification transport package. Data transfer permissions may be required for access to package manager 302 to transfer modifications between development, quality assurance and production environments. Finally, hot deployment and hot patch permissions are used to access hot deploy module 304 to perform a hot fix, hot patch or "hot deploy" of a software implementation. Alternate embodiments may employ one or all of these elements, as well as additional elements and procedures for implementing application modification.

A common requirement for application customization is to modify database schema, such as application database schema 334 of FIG. 8. The present application modification method and apparatus uses a dictionary to introduce database schema change. One example uses a JAVA dictionary for file store dictionary 210 of FIG. 6. A JAVA dictionary is a central repository for database objects. Alternate embodiments may employ other forms of dictionaries, libraries and support structure. A custom dictionary is created and deployed, along with an original application dictionary, to a database. For easier technical support and trouble shooting, such as by a software vendor, an original application dictionary is typically not modified.

On a request to change a relational database query, a user uses a named query modification utility to make query modifications. Custom dictionary and "named query" modifications are then packaged and transported to quality assurance or production servers using cross-server package manager 302.

Figure 9A:
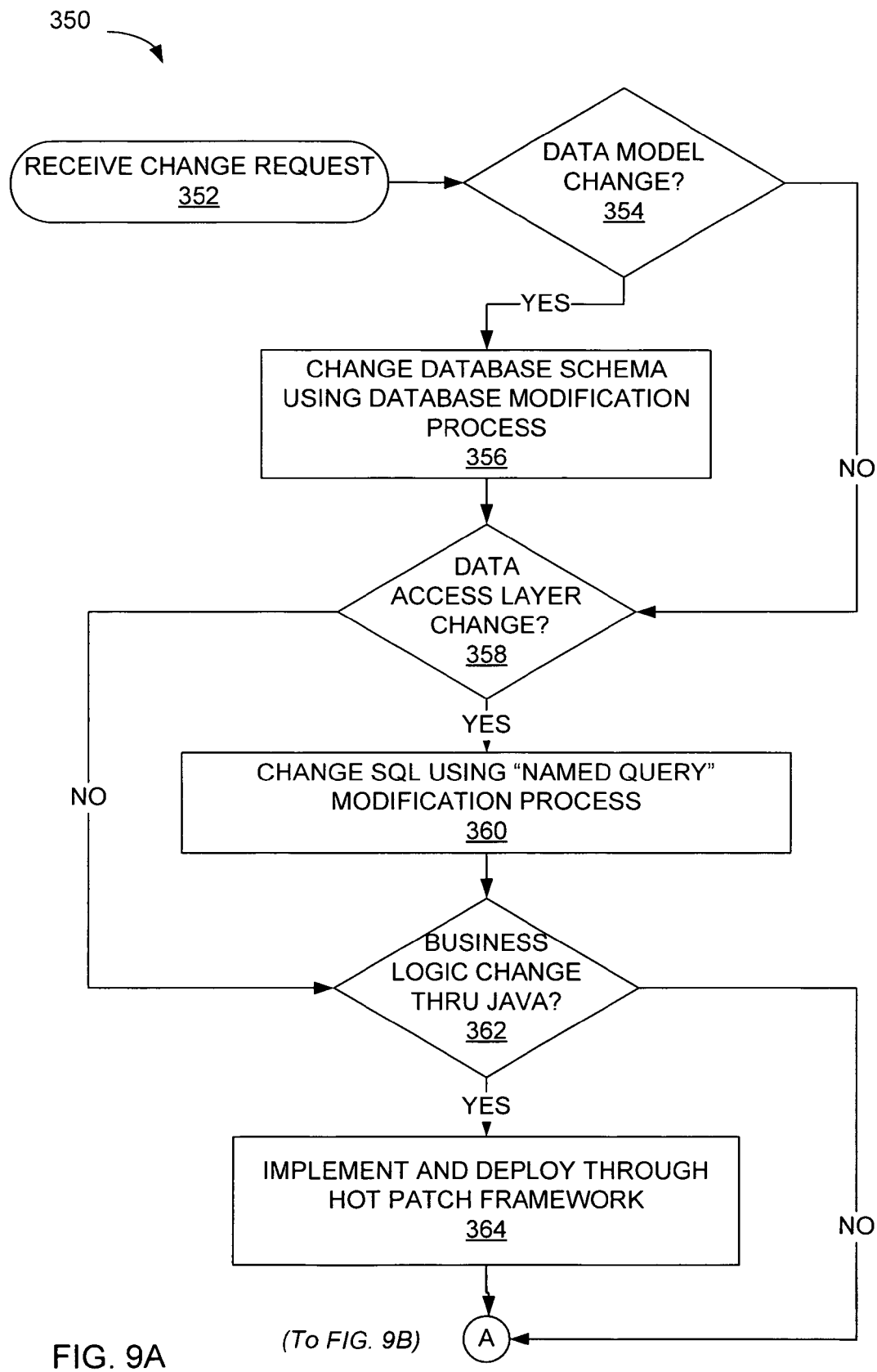
FIGS. 9A and 9B illustrate application modification, according to an example embodiment.
Figure 9B:
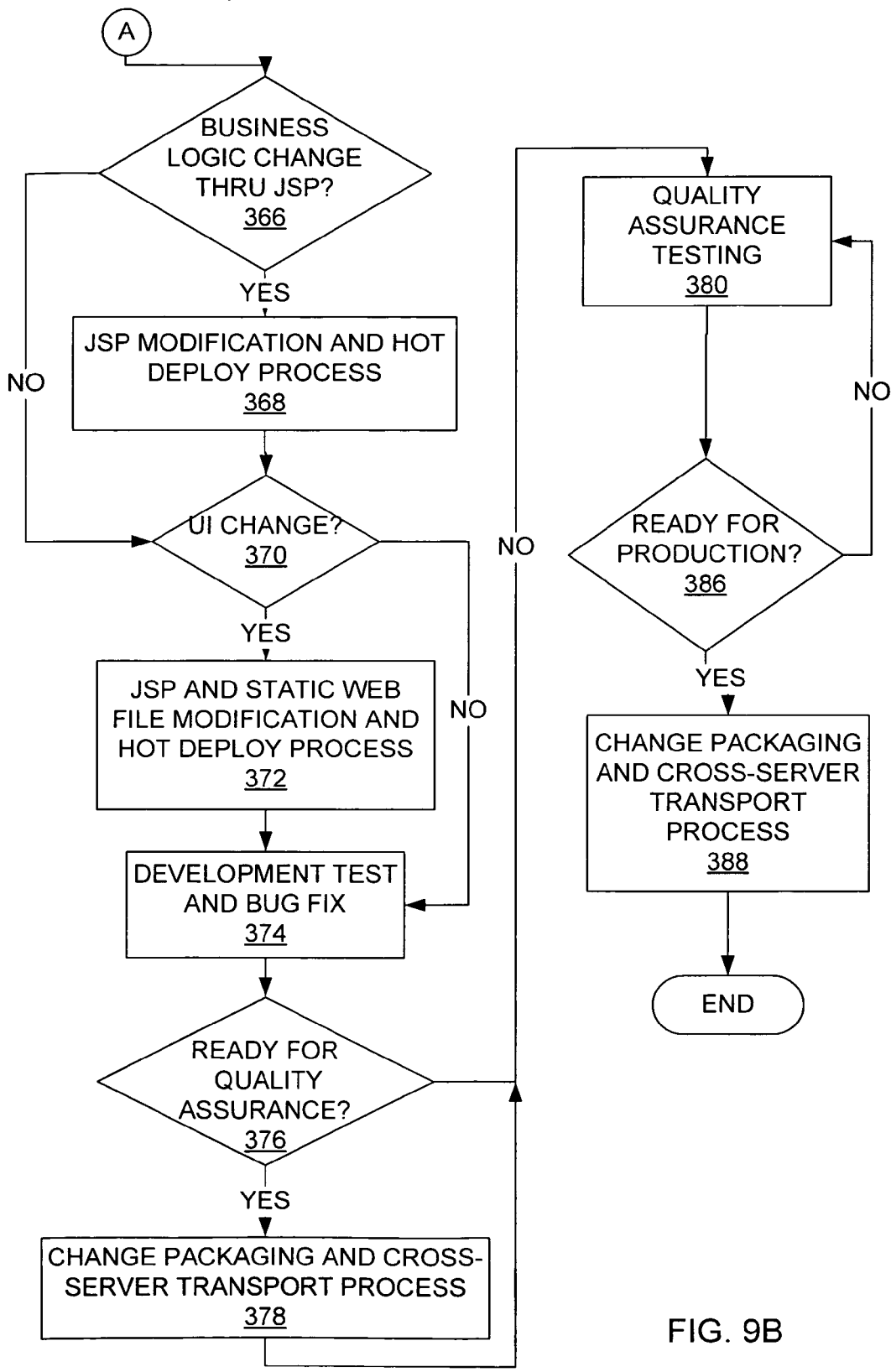

FIGS. 9A and 9B illustrate application modification, according to an example embodiment, where processing begins on receipt of a change request, at 352. Determination is made as to whether the requested change is for a data model change, at 354, in which case the process changes the database schema using a database modification process, at 356. This is a change in the database schema, such as organization of tables and the database. Processing continues to decision diamond 358, to determine if the received change request involves a data access layer change, in which case processing changes SQL using a named query modification process, at 360. Processing continues to determine if business logic will change through JAVA, at 362, in which case the process implements and deploys through a hot patch framework, at 364. The modifications framework handles multiple types of modifications, including database changes, amendments and additions to strings, named queries, or business logic. This includes, but is not limited to, HTML, JAVAScript, CSS, images, JSP, JAVA class files, JAVA jar files, and so forth.

Basically, the modifications framework handles multiple types of modifications. They are database, strings, named queries, or business logic (htm, javascript, css, images, java server page, java class file, java jar file). The process described is how the modification framework decides which modification to implement.

The process continues as illustrated in FIG. 9B to determine if business logic will change through JAVA Server Pages (JSP), at 366, in which case JSP modification and hot deployment processes are implemented, at 368. JSP is used to create web sites using dynamic generation and allows JAVA code and certain pre-defined actions to be embedded into static content. Note that business logic changes in other embodiments and examples may implement other software frameworks and constructs, which use alternate methods for modification according to the appropriate software specifics.

Processing continues to determine if there is to be a UI change, at 370, in which display and interface modifications are made and hot deployed, at 372. In the present example, JSP and static web files are modified and then hot deployed. Development tests are performed and bug fixes are implemented, at 374. When the application modifications are ready for quality assurance, at 376, the process changes packaging and cross-server transport processing, at 378. Quality assurance is performed, at 380, and a determination is made as to whether the modified application is ready for production, at 386. At this point, the process changes packaging and cross-server transport processing, at 388.

Figure 10:
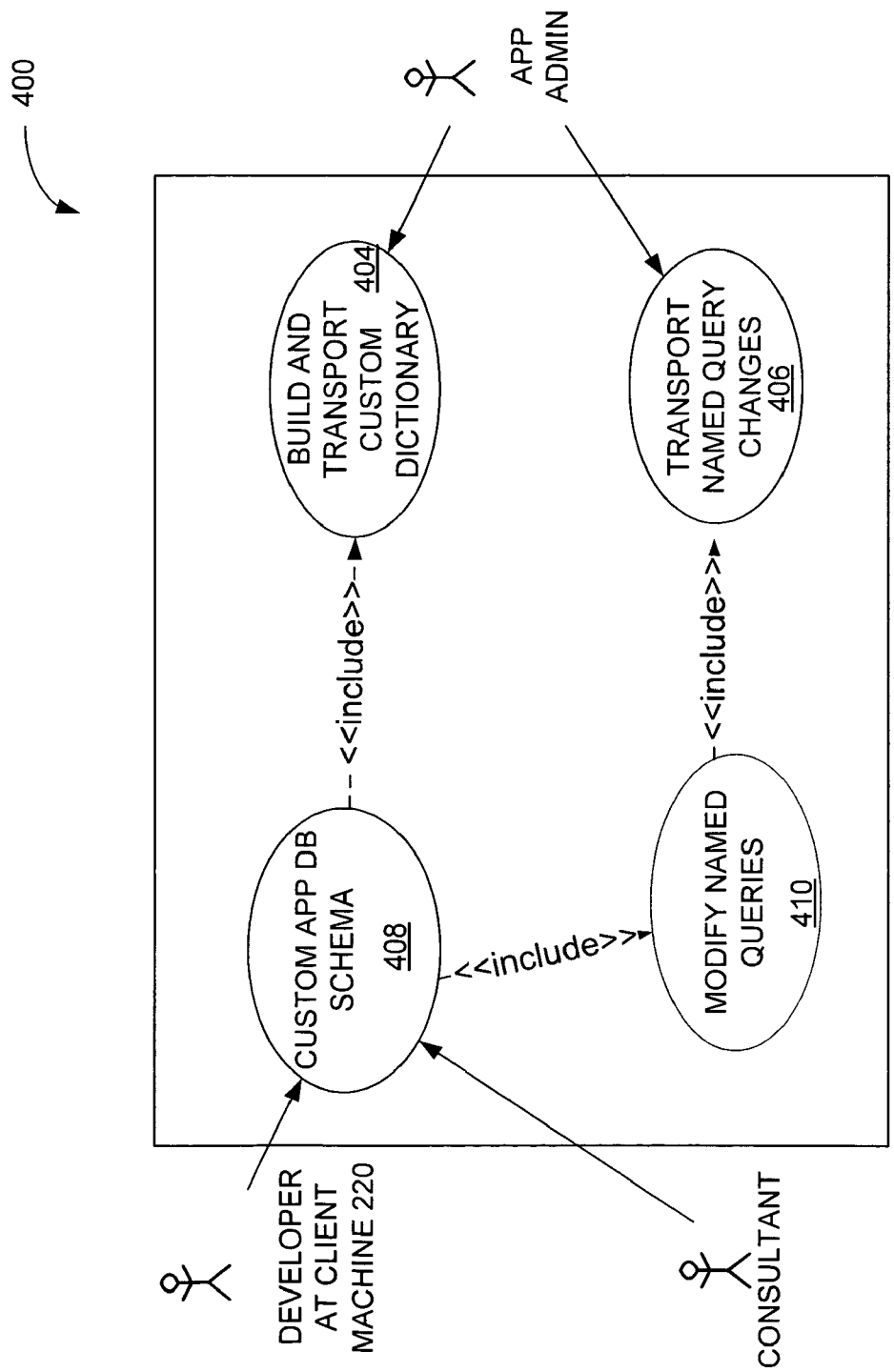
FIGS. 10 and 11 illustrate a process for application customization and modification of database schema, according to an example embodiment.

As illustrated in FIG. 10, a developer at a client machine 220, a consultant at a client machine 220, and an application administrator having access to a system, such as integration technology platform 200 as in FIG. 6, each access information within the system 400. The processing of information is presented in state diagram format, wherein a developer at a client machine 220, or a consultant, creates a custom application database schema, 408. Database schema refers to the organization of the database, including row and column definitions. The schema encompasses database structure described in a formal language supported by a DataBase Management System (DBMS). In a relational database, for example, the schema defines tables, fields within tables, and the relationships between fields and tables. A database schema is stored in a data dictionary. Database schema may also be used to refer to graphical depiction of the database structure. The custom application database schema is used to extend the functionality of the application. It is transported and deployed using traditional Application Server deployment. Modify named queries, 410 are named queries that are created which retrieve this extended data and possibly merge the results of this data with the data from the base application dictionary. These modify named queries are detailed herein below.

The transport described in FIG. 10, means that the modification is packaged for transport and use. This packaged modification is then transported to a target server, such as application server 330 of FIG. 8. The package manager 322 at the target server, application server 330, manages hot deployment of the received package, i.e. modification. While such a modification is originally made at a client machine by a developer, the client desires to include the modifications at the application program running on the application server 330, (e.g., production machine).

Figure 11:
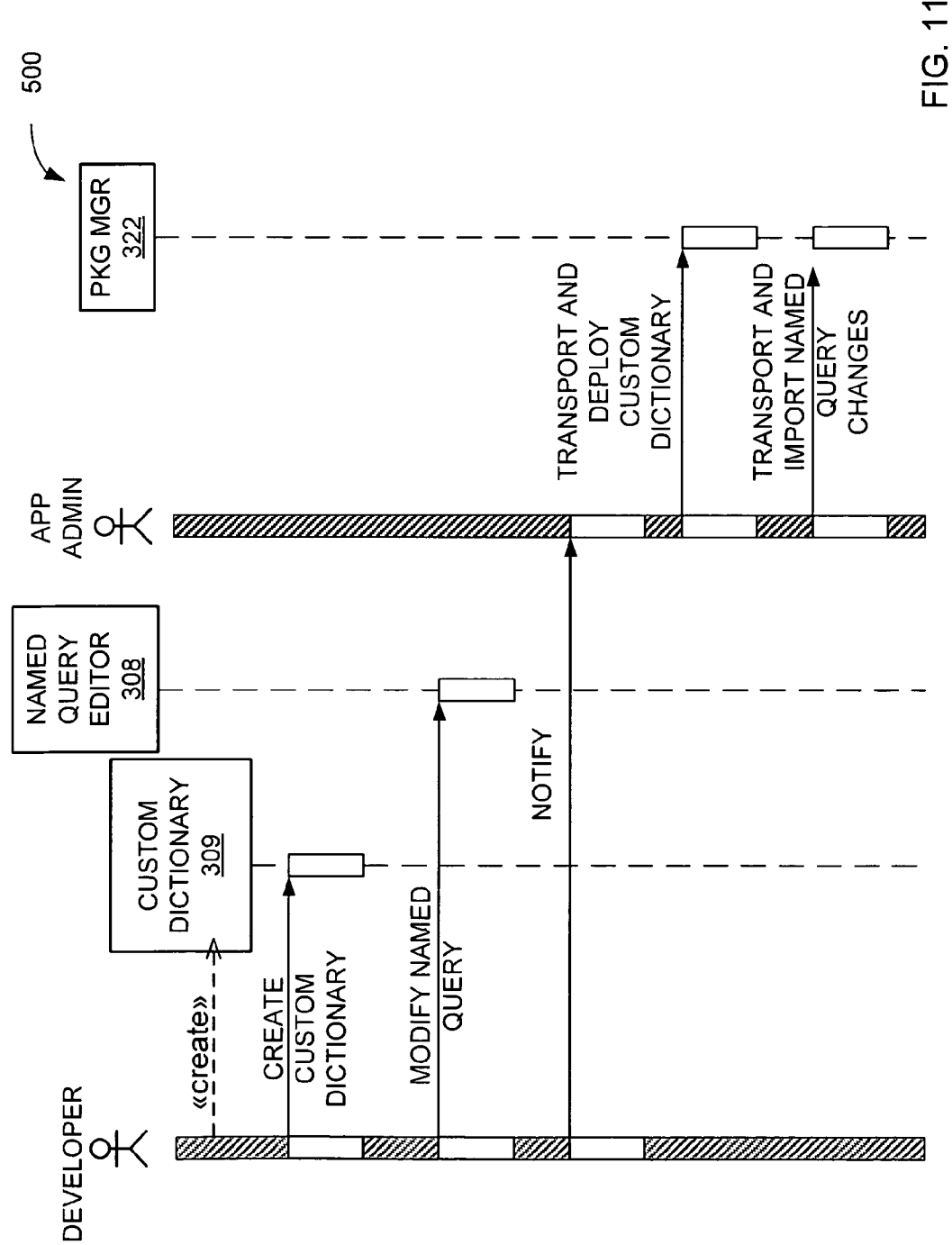

FIG. 11 illustrates processing consistent with the state diagram and flow processing of FIG. 10. A developer or consultant initiates processing to create a custom dictionary 309, step 1. In the present example, a developer creates a custom JAVA dictionary and tables using an integration platform and developer studio. Alternate embodiments may implement other formats and platforms. The development environment of the present example supports development of JAVA-based, multiple-layered business applications, and is based on a plug-in, such as Eclipse, wherein the architecture provides a suitable platform for incorporating specific functions. This offers a single point of entry for development tools as well as support in developing applications. Application developers need not switch between different development environments for the presentation and business logic, but the development environment allows development, building, deployment, and execution of applications from a central location or node.

Continuing with FIG. 11, the developer modifies a named query to make a relational database query change using named query editor 308, step 2, and notifies the application administrator. A named query is a technique for externalizing a relational database query and storing this information in a database table, such as in database 208. In this way, a relational database query can be modified without a software build and deploy process. An externalized named query is retrieved and executed by its unique name, such as in JAVA code given as:

| JAVA API |
|---|
| public void executeNamedQuery(Connection con, String _namedQueryName, String[ ] _parameterValues) JSP tag <strategy:strings queryName='getKPI' parameterValues="1" /> |

Continuing with FIG. 11, the application administrator initiates the transport and deployment of a custom dictionary to quality assurance or production using package manager 322 and deploys a custom dictionary to the package manager 322, step 3. Finally, the application administrator transports and imports named query changes to the package manager 322, step 4.

To improve performance, named query database tables are cached in the application server using a table buffer technique. A web based named query editor 308 is created for named query administration purposes. This utility provides named query database Create, Read, Update and Delete (CRUD) operations. Named query changes can be transported and imported into a quality assurance or production database using package manager 322.

A developer or consultant is able to create named queries, 420 or modify named queries, 410. Both are included in the transport and importation of named query changes, 424. In one embodiment a named query is a predefined relational query that is stored in a relational database associated with the application program. When accessed, a named query applies application parameters and then executes an SQL statement. Using this technique, it is possible to modify the SQL code for the named query and effect a change in the application without modifying the application program source code; and such modification is possible from the client machine.

As described in the present example, a named query is a SQL expression represented as a table, wherein a named query specifies an SQL expression to select rows and columns returned from one or more tables in one or more data sources. A named query is like any other table in a data source view with rows and relationships, except that the named query is based on an expression. A named query allows extension of the relational schema of existing tables in a data source view without modifying the underlying data source. For example, a series of named queries may be used to split up a complex dimension table into smaller, simpler dimension tables for use in database dimensions. A named query may also be used to join multiple database tables from one or more data sources into a single data source view table.

In an enterprise system, the named query is a saved, defined, business logic application query, or relational query in a relational database. When a client desires to retrieve additional data beyond the data retrieved by running a named query provided by the existing or current application program, the client is able to modify the named query or add a new named query. The modification or new query changes the relational query to satisfy the new relationship. The modification is then moved by a transport mechanism to a new system, which in this case is transported to the central application server. When a client builds a new query, the new query is assigned a new name.

Figure 12:
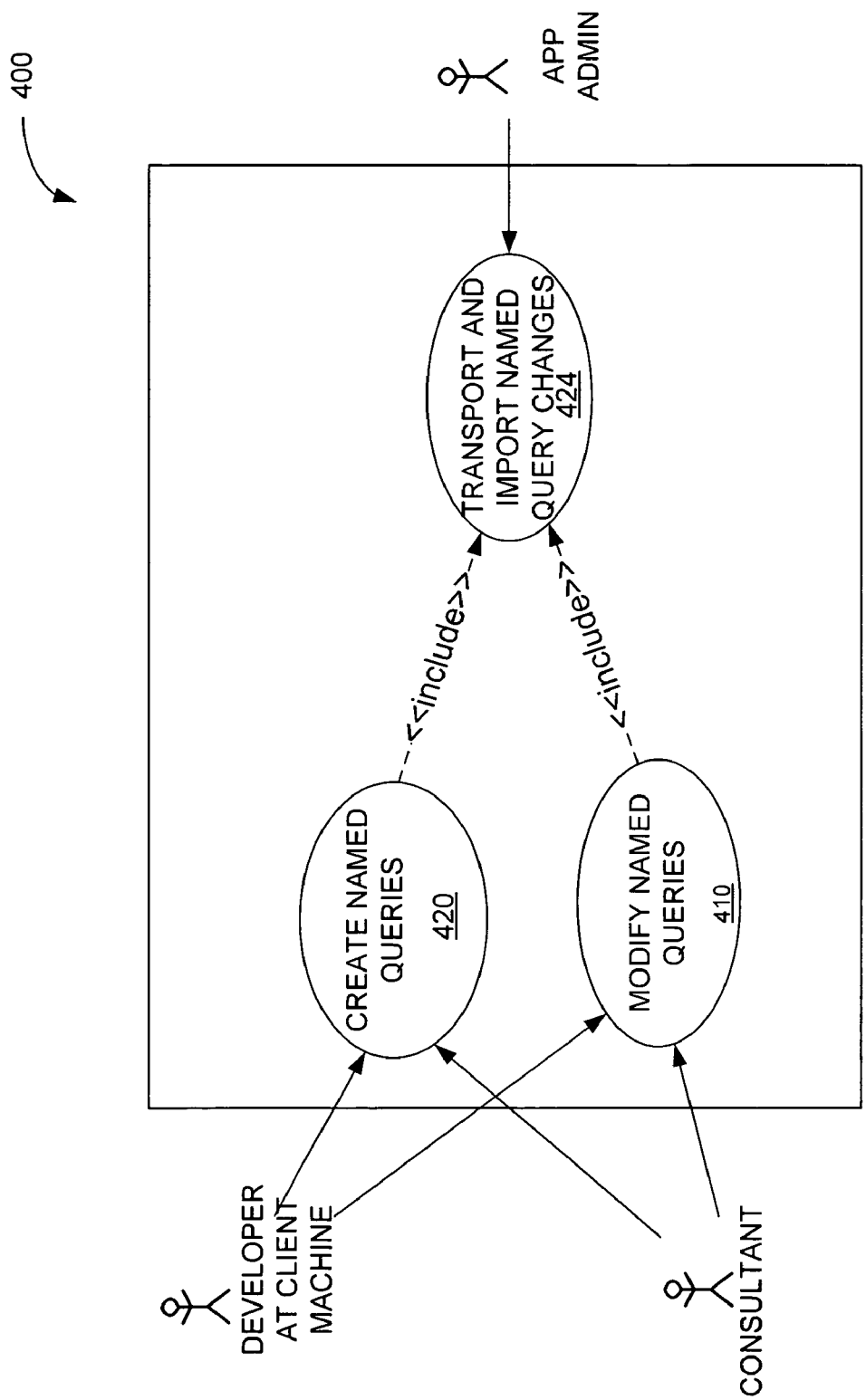
FIGS. 12 and 13 illustrate a process for modification of named queries, according to an example embodiment.
Figure 13:
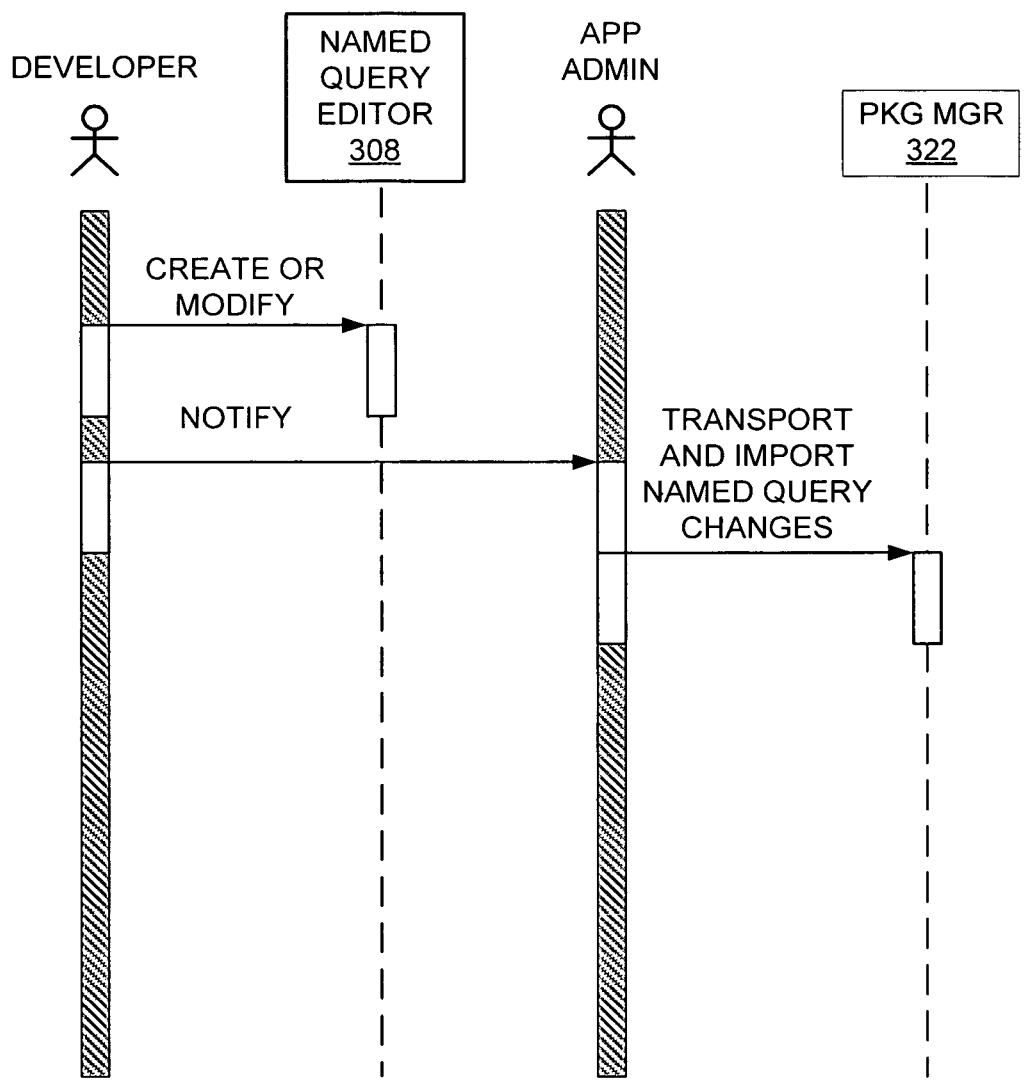

FIG. 13 illustrates processing corresponding to the state diagram of FIG. 12, wherein a developer creates or modifies a named query, step 1 and notifies the application administrator. The developer uses named query editor 308. In response to the notification, the application administrator transports and imports the named query changes, step 2, to the package manager 322. A transport mechanism allows a user to export data from one application server and import the data to another application server. For example, a developer may make a change to a client machine and exports the change to a central application server. Still further, an administrator of the central application server may introduce changes to a program running in a development environment, such as on a development machine, and then import such changes to a production application server. As illustrated in FIG. 8, package manager 322 provides the transport function to move program information between machines and application servers.

In another aspect, UI textual information, or strings, are captured by locale-specific resource bundles and stored in a relational database. Each UI string is referenced from an application by its unique name. For example, a JSP string may be referenced by
<strategy:strings code='string_00'/>/.

To improve performance, UI string database tables are cached in an application server using a table buffer technique. In one example, a web based "strings editor" is created for UI string administration purpose, providing UI string CRUD operations. UI string changes are transported and imported into a quality assurance or production database using change transport utility.

Consider the integrated technology platform 200 of FIG. 6, wherein strings are stored in the relational tables of the central database 208. It is possible to modify strings, wherein changes are implemented as changes to business logic. String modifications are exported from the client or development system and imported into the target application server, such as central application server 202 or a production system. As mentioned hereinabove, package manager as in FIG. 8 provides the transport mechanism for moving data, including importing into a target system, implementing the modification, managing change, and application program auditing.

Figure 14:
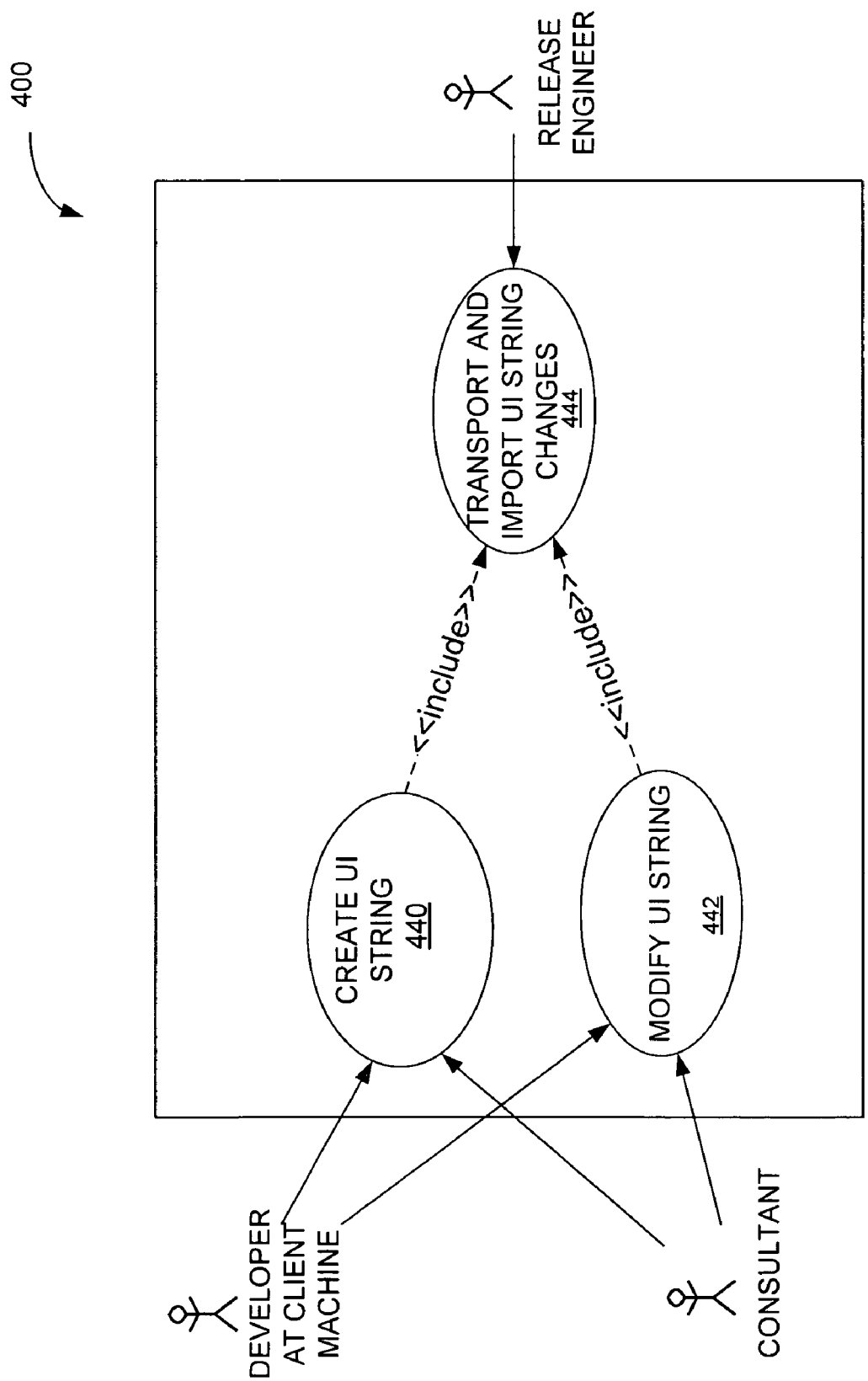
FIGS. 14 and 15 illustrate a process for modification of User Interface (UI) strings, according to an example embodiment.

The process is further illustrated in the state diagram of FIG. 14, wherein developers and consultants are able to create UI strings, 440, and modify UI strings, 442. Both result in transport and import of UI string changes, 444. The release engineer receives the changes.

Figure 15:
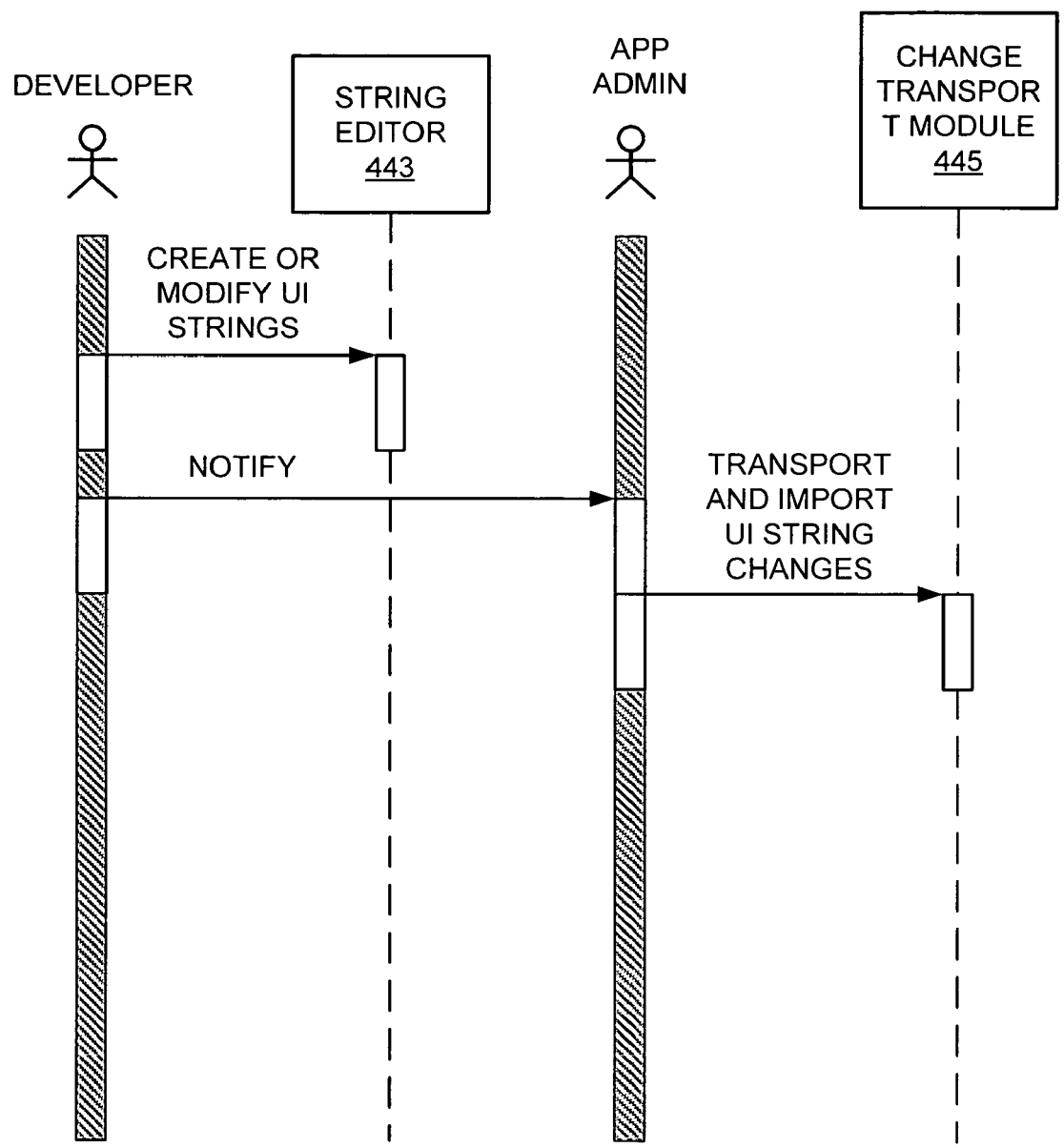

The process is further detailed in FIG. 15, where the developer creates or modifies the UI strings, step 1, and sends to a string editor 443. The developer then notifies the application administrator, step 1.1, and in response, the application administrator transports and imports UI string changes, step 2 to a change transport module 445. A user interface for a strings editor is illustrated in FIG. 16. User 102 enters an application name and database name, which in one embodiment are pull-down menus. Upon entry of a search query, search results are provided in a list organized by string text and other characteristics. User 102 is able to edit or delete entries in the search result list. Editing is provided at the bottom of the screen display. Additionally, such a user interface allows user 102 to add a new string. In another aspect, a "file store" technique is used to store, customize and patch application source files, wherein a set of relational database tables provide storage for text and binary files. Using a file store technique, the application is not restricted to use of an operating system file system, thus solving file maintenance issues when in a clustered environment. Additionally, the file store technique is flexible for use with various operating system differences (e.g., Windows, UNIX, Linux).

The file store techniques provide a set of relational database tables storing text and binary files. Referring to FIG. 8, a file store is included in file system 332. File store Application Programming Interfaces (APIs) provide the client with various levels of abstraction. Different layers of abstraction are built into the APIs, wherein the APIs allow different inputs. File store APIs provide levels of abstraction, including: (i) stream based I/O API for creating and retrieving files, (ii) character based I/O API for creating and retrieving files, (iii) additional API for file CRUD and file metadata retrieval, (iv) HTTP Access (JSON Service) to File Store. Stream based Input/Output (I/O) API is for creating and retrieving files. Character based I/O API is for creating and retrieving files.

Additional APIs are used for file CRUD and file metadata retrieval. A HyperText Transfer Protocol (HTTP) Access API, such as JSON Service, is used to implement a file store technique.

A file store refers to a master table of file store data dictionary 204. This table contains file data, along with unique identifiers in the application and file origin information, such as client or other information. FIG. 17A illustrates an example of File Store 500, which is illustrated as a table having entries in rows 530 to 540, and with various information stored in columns for each entry. The columns include column name 522, type 524 and description 526. In a first example, entry 530 has a column name of ID, a type of long, and is described as a primary key. Each file store table 500 is associated with an object, data item or file stored in file store data dictionary 204.

FIG. 17B illustrates another table, entitled FS_META-DATA file 550, having the same column organization as file store table 500 but with different entries in rows 560 to 568. The columns include column name 552, type 554 and description 556. The table 550 contains file metadata information. A file stored in File_Store table 500 may have multiple metadata associated with it. The FS_METADATA file 550 stores metadata associated with a file stored in file store data dictionary 204, such as a file version number, and other data.

FIG. 18A illustrates FS_PERMISSION table 600, which is a table containing file permission information. In one example, a user 102 having write permission is allowed to modify a file. File permissions are generally assigned by the application administrator, and allow for open, read, write, copy, etc. Users 102 are then able to access the file according to the permissions assigned to them. Table 600 includes columns of column name 622, type 624 and description 626. Table 600 is organized with entries in rows 630 to 640.

FIG. 18B illustrates a FS_SHADOW table 660, which is the shadow table of File_Store table 500. Table 660 contains a change history of FILE_STORE table 500 and is used for auditing purposes. Table 660 is also used by "rolling-back to previous installation" process. Table 660 includes columns of column name 662, type 664 and description 666. Table 660 is organized with entries in rows 660 to 670.

FIG. 19 illustrates HOT_DEPLOY_AUDIT table 700, containing hot deploy and hot patch history for auditing purposes. This table is also used for rolling-back to previous installation process. Table 700 includes columns of column name 702, type 704 and description 706. Table 700 is organized with entries in rows 710 to 718.

As in FIG. 8, file store manager 312 provides high level access to file store data dictionary 204, including uploading files and database CRUD operations. As illustrated in system 750 of FIG. 20, two client interfaces are built for file store manager 312 including a web browser 768 and an Eclipse plug-in 758. Web browser 768 provides an interface to support searching, browsing, viewing and deleting of files, and is adapted to upload a single file or multiple files from an archive. Eclipse plug-in 758 supports file editing and other operations mentioned above. By using Eclipse plug-in 758, user 102 has access to features of Eclipse, such as a JSP editor and file compare utility. Alternate embodiments, however, may implement other software applications or plug-ins having functionality for software development. In the present example, Eclipse plug-in 758 provides a multi-language software development platform having an Integrated Development Environment (IDE) and a plug-in extension system, which is written in JAVA.

Figure 20:
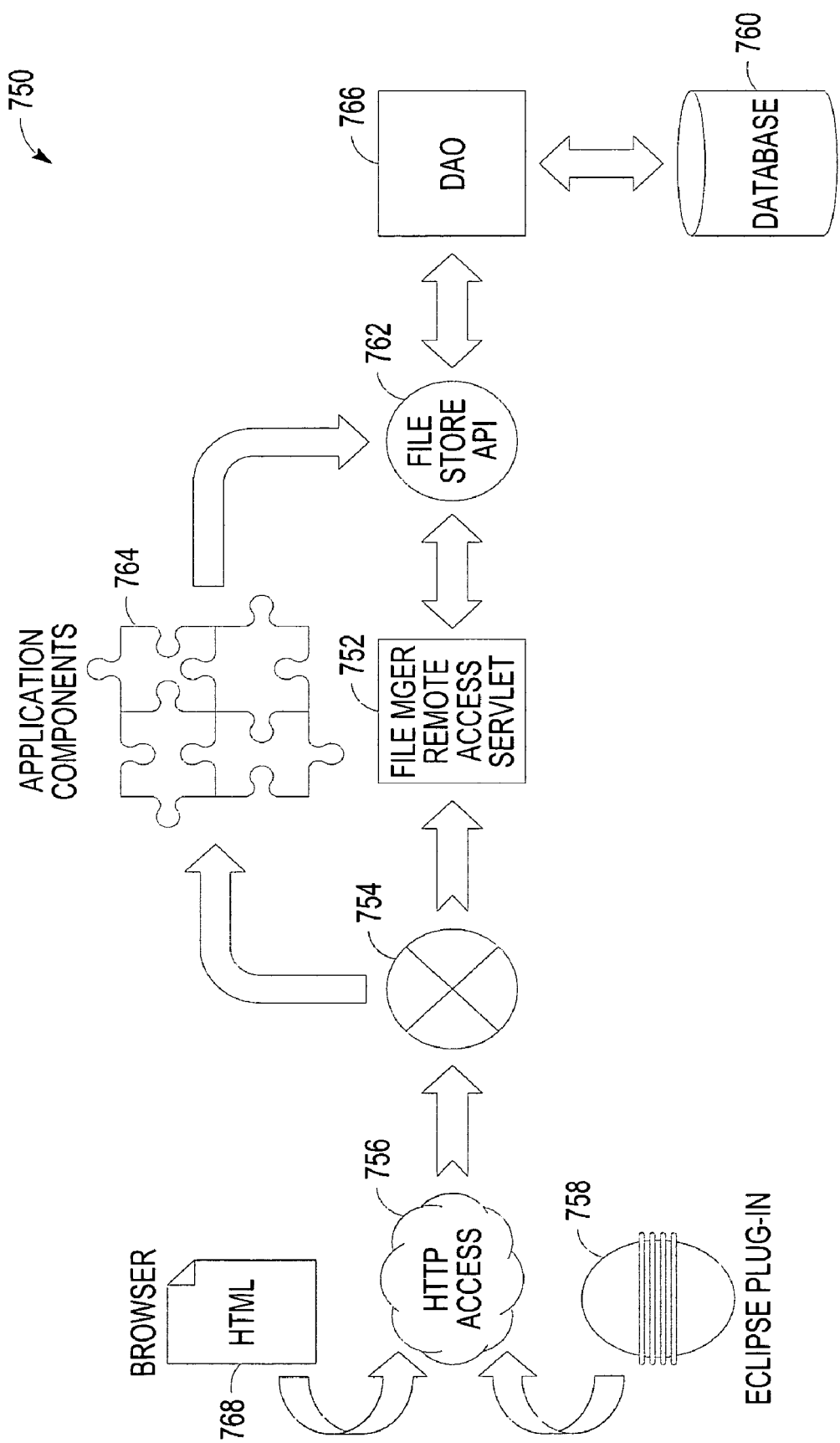
FIG. 20 illustrates a system 750 for an integrated technology platform, having two client interfaces for file store manager 312 of FIG. 8, according to an example embodiment.

Within system 750 of FIG. 20, file manager 752 provides file versioning, wherein on updating a file, the file manager 752 saves a copy of the previous file prior to editing. The previous files are denoted with a #<n> suffix. For example,

| File name: | mycustomtable.jsp |
|---|---|
| First Modification: | mycustomtable.jsp#1 |
| Second Modification: | mycustomtable.jsp#2 | wherein user 102 compares the file versions easily, and is able to restore a previous version of a file using file manager 752 in combination with Eclipse plug-in 758 interface.

Further within system 750 is network access, HTTP access 756, which is typically via the Internet, but may be provided as another type of network providing connectivity in a distributed environment. A request router 754 routes information to file manager 752, which includes a remote access servlet, as well as to application components 764. File manager 752 and application components 764 communicate with file store API 762, which enables an I/O stream function as well as a read/write function. File store API 762 interfaces with Data Access Object (DAO) 766, which is an object providing an interface to database 760, and may also interface with other persistence mechanisms. DAO 766 provides various specific operations without exposing details of database 760. DAO 766 enables isolation and separation of concerns regarding what type of data accesses a given application needs to function and how these needs can be satisfied with a specific DBMS, database schema, and so forth, such as related to an implementation of DAO. The DAO provides domain-specific objects and data types, such as related to a public interface of the DAO. The implementation of DAO 766 as an interface to database 760 is typical of those used with JAVA EE applications and with relational databases.

Toward modification of dynamic and static web page files, the user 102 is able to change the look and feel of the UI. Such changes are typical in application customization and incorporate consultants in the field to access and modify various types of web page files, including JSP, HTML, JAVAScript, CSS, and other visual and audio files and images. In one embodiment, "modifiable" web page files are added to file store data dictionary 204 as part of an application bootstrap process, wherein the web page files are accessed and used as templates to create custom web pages using file manager 752 in combination with Eclipse plug-in 758 as an interface. As a result of this processing, pointers to original web pages are redirected to custom web pages.

In one example, a security scheme is also implemented to allow the user 102, such as a developer or consultant, to modify functions; such access is granted using "source modification" permissions, which allow user 102 to modify source code. Source code file changes are uploaded into file store data dictionary 204. From there, files changes are transported to quality assurance or production file stores using package manager 322 (FIG. 8). The changes are then hot deployed to an application server using a cluster safe hot deployment utility, such as implemented by hot deployment module 304 of FIG. 8.

Figure 21:
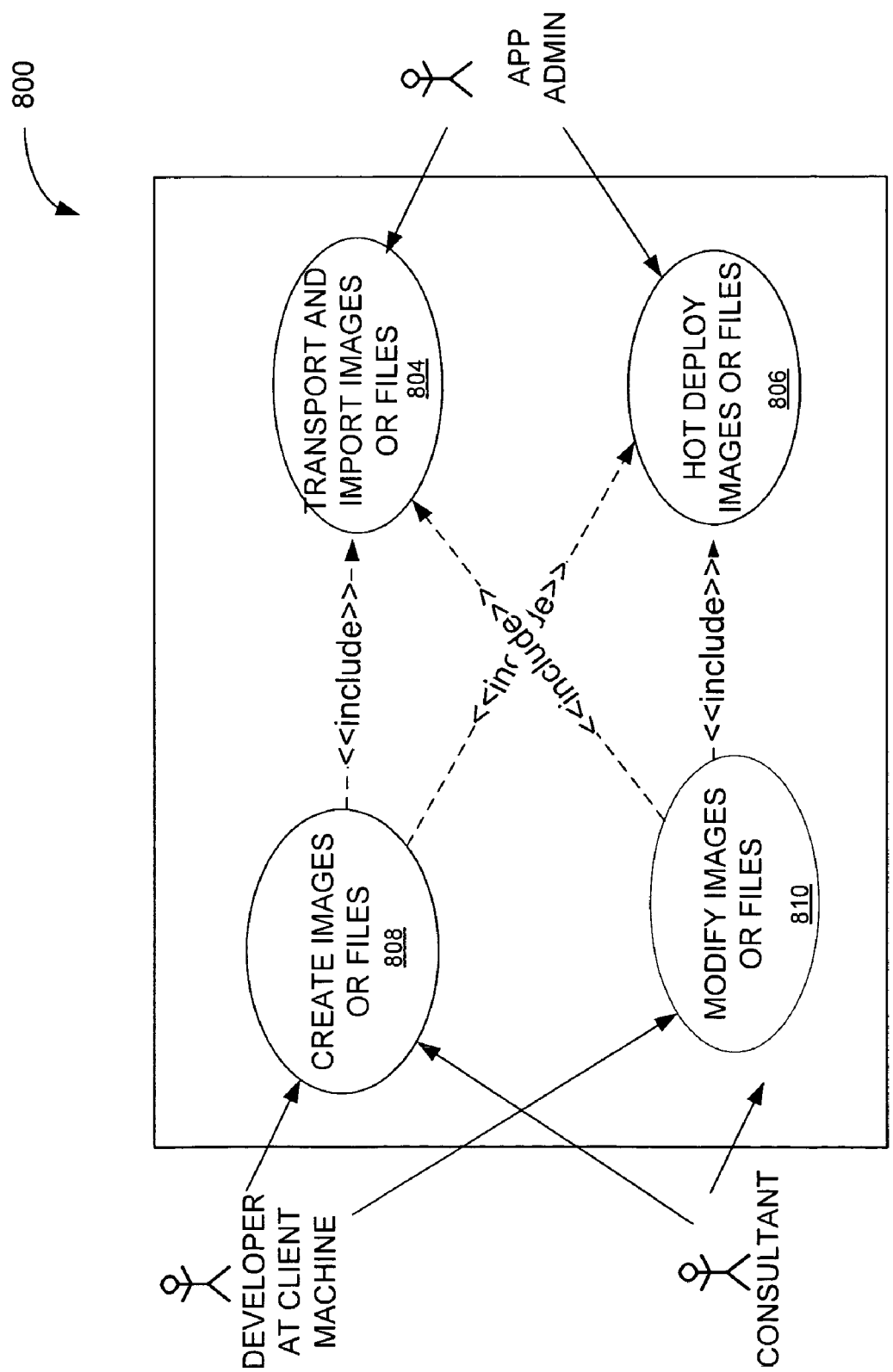
FIGS. 21 and 22 illustrate a state diagram 800 and a process flow diagram for modification of web pages or other UI images, according to one embodiment.

FIG. 21 illustrates an example state diagram 800 illustrating modification of web pages or other UI images. Developers and consultants at client machines 220 create images or files, 808, such as JSP, HTML, JAVAScript, Cascading Style Sheets (CSS) or other images. Similarly, such images or files are modified, 810, from client machines 220. Created or modified images and files are transported and imported, 804, for use by an application administrator. Created or modified images and files are hot deployed as well, 806.

Figure 22:
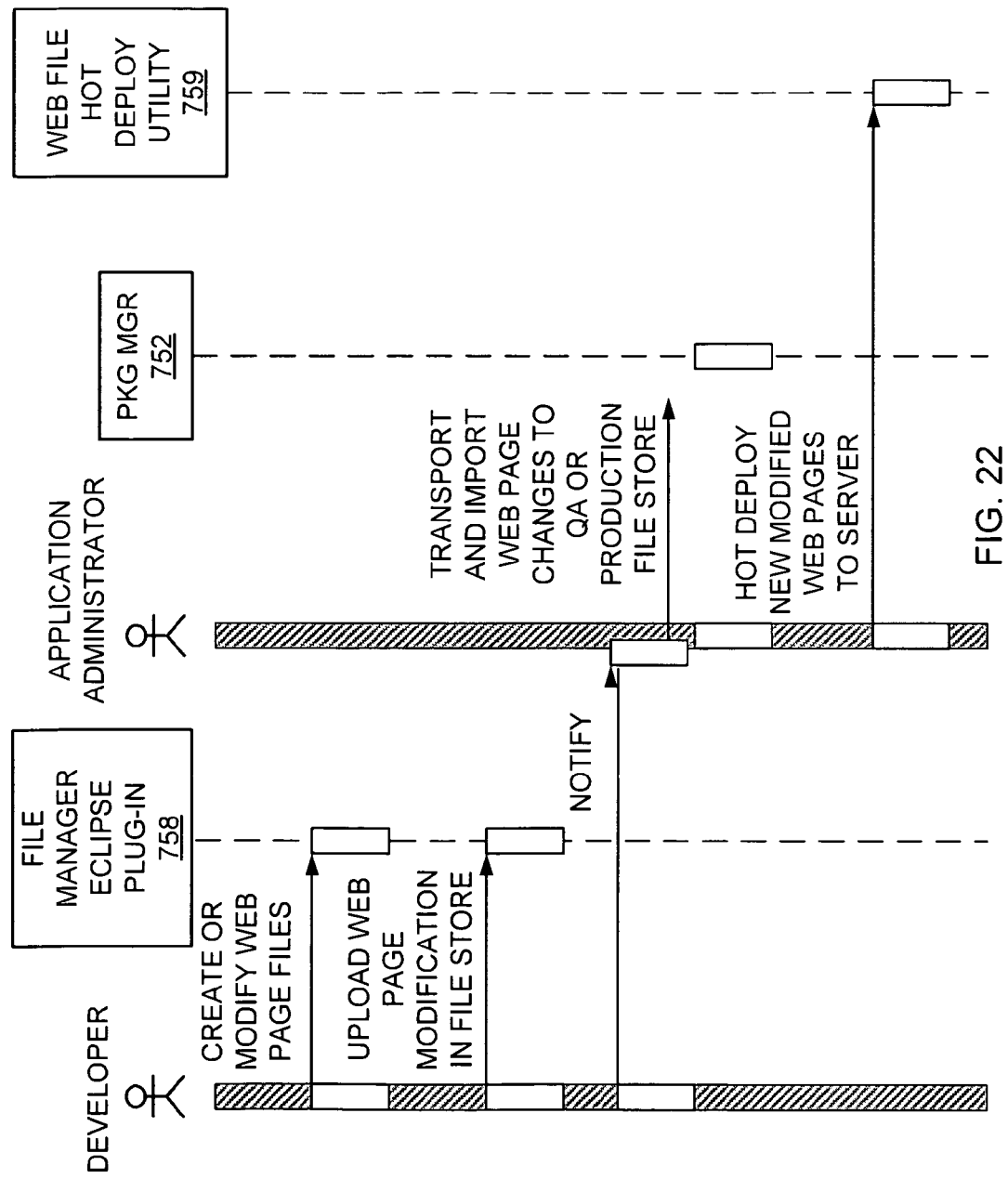

FIG. 22 illustrates a process flow 750 further detailing the operations of state diagram 800. A developer creates or modifies web page files, step 1, and provides such to file manager 752 and Eclipse plug-in 758. The developer then uploads the web page modification into the file store data dictionary 204, step 2, and notifies the application administrator, step 2.1. The application administrator function is specific to the application under consideration. In response to receiving notification of modifications, the application administrator implements transport and import of web page modification to quality assurance or production files stores, step 3. The transport and import of modifications is provided to the package manager 322. The application administrator also implements hot deployment of the new modified web pages to the application server, such as central application server 202 (FIG. 6), step 4. The hot deployment is performed through a web file hot deployment utility 759.

Typically a client, such as a customer to the business application software and service, will have separate application server installs for development, quality assurance, and production environments. The application is installed on each of separate servers for each purpose. Each application then has a specific file store. When a software vendor provides a software patch to customers, such as to fix a mid-tier problem or to tailor business logic to satisfy customer's special requirement, it is difficult to apply the patch and enter production without implementing a software installation process. The ability to hot deploy such patches improves customer satisfaction and reduces software maintenance down time. In one example, a hot patch technique solves many of these issues and reduces implementation time to production for a mid-tier patch.

According to one example, during standard application deployment, an integrated technology platform 200 opens a Software Component Archive (e.g., *.SCA), and copies its contents to a local file system according to a pre-defined structure and file system path. Any compiled JAVA class files in a web component (e.g., *.war) are copied to a specific location, which by default is included in an application class path. Other development component libraries are copied to specific locations as well. JAVA Archive (*.jar) files are included in an application class path. The application hot patch utility is built based on such deployment feature. Compiled JAVA class files are packed in a software patch in a defined structure by package manager 322. The mid-tier hot patch utility analyzes the file structure of the software patch and copies JAVA class files to a corresponding deployment location in the file system. A hot patch utility is implemented using a message-driven bean to ensure cluster security. The application may be required to restart the application cluster after hot patch processing.

Figure 23:
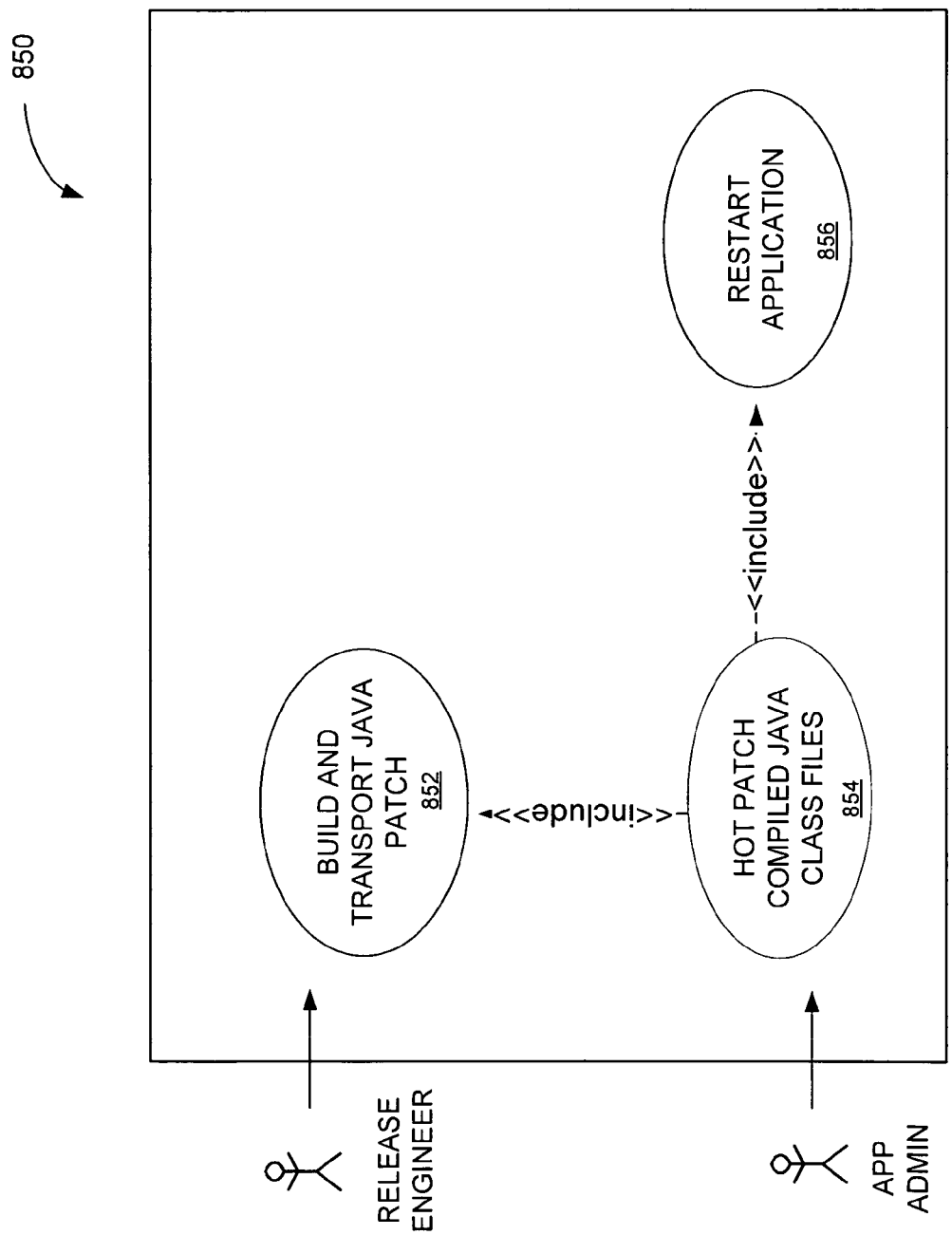
FIGS. 23 and 24 illustrate a state diagram 850 and a process flow for a hot patch procedure, according to an example embodiment.
Figure 24:
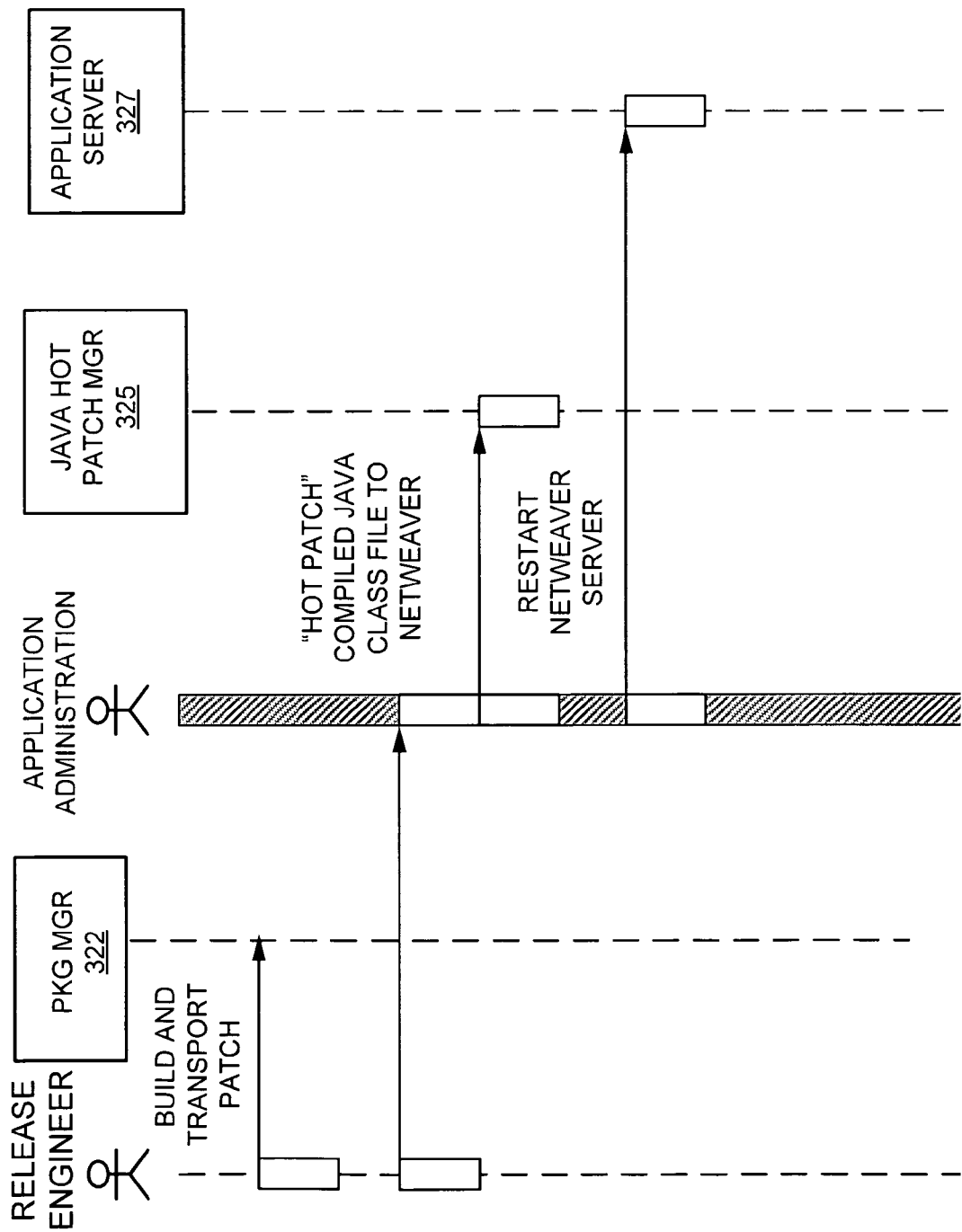

FIG. 23 illustrates a state diagram 850 of a hot patch procedure, according to an example embodiment. As illustrated, a release engineer or other party responsible for implementing patches, builds and cross-server transports a JAVA patch, 852. The application administrator initiates a hot patch of a compiled JAVA class file. On completion of the hot patch, 854, the application is restarted, 856. A corresponding process flow diagram is illustrated in FIG. 24, wherein a release engineer builds and transports a patch using package manager 322, step 1. A notification is sent to the application administrator identifying the modification and changes, step 1.1. In response, the application administrator implements a hot patch of compiled JAVA class file(s) to a JAVA hot patch manager, step 2. The application administrator copies compiled JAVA class files in the patch to an appropriate application deployment location using the JAVA hot patch manager 325. The application administrator then restarts the application at an application server 327, step 3.

In an example embodiment, a package manager 322 creates a transport package for modification of data with a definable structure. For example, the structure may include named query, UI strings and files in files store 204. Other functions include importing modifications into a target database, creating transport packages for JAVA patches, cross-server data transfer through web services, such as by use of a Change and Transport System (CTS), and transport auditing.

The package manager 322 allows a user 102, such as a developer, to create and import a change package with fine granularities based on a broad range of criteria, including modification type (e.g., named query, UI Strings, web pages, JAVA classes and JAVA ARchive), modification date range, file path pattern, and modification owner.

Application modification includes hot deployment of a web page or other UI images or files. During application deployment processing, an application server opens a delivery archive, such as an SAP Software Delivery Archive (.SCA) in NetWeaver, and copies the archive contents to a local file system according to a definable structure and file system path. A root location of web content is identified and web pages in a web component (e.g., *.war) are copied to a location within or under the root location of the web content.

For static web pages, a hot deployment utility analyzes a file path for static web pages in file store data dictionary 204 and copies the file to a location within identified for application deployment in the file system. A web container uses a modified web page for subsequent requests.

When an application servlet engine receives a first request for a JSP, the servlet engine compiles JSP into a servlet class. As in FIG. 22, a servlet engine manages steps 3 and 4, wherein the servlet engine is implemented as JAVA. In the sequence diagram of FIG. 22, the servlet engine code in the application server.

Similarly, if a JSP request is received after a modification, the servlet engine compiles the JSP into a servlet class. Servlets are used by JAVA programming language and represent classes for dynamically processing requests and constructing responses. The basic servlet package defines JAVA objects to represent servlet requests and responses, as well as objects to reflect the servlet's configuration parameters and execution environment. The JAVA Servlet API allows a developer to add dynamic content to a web server. The generated content is commonly HTML, but may be other data such as XML. A servlet defines interactions with a web container, wherein a web container is a web server component responsible for managing the lifecycle of servlets, mapping a URL to a particular servlet and ensuring that the URL requester has the correct access rights. Servlets are generated automatically by JSP compilers.

A JSP hot deployment utility is built based on a JSP compilation mechanism, and as discussed above, a JSP hot deployment utility analyzes a file path of a JSP in file store data dictionary 204, and copies the file to a determinable application deployment location in the file system. The JSP hot deployment utility is a hot deployment technique using JAVA code to provide updates to source code functionality by modifying operation of object code. Effectively, the changes are applied to the application program without requiring restart or reinstall.

For each modification, including additions, a timestamp is applied to the modification at the time of implementation. The change in timestamp is a concept that the application server uses to determine that a change has been made to the JSP file. The application server detects a change in a JSP file and automatically initiates deployment of these changes. A timestamp is applied at deployment.

Figure 25:
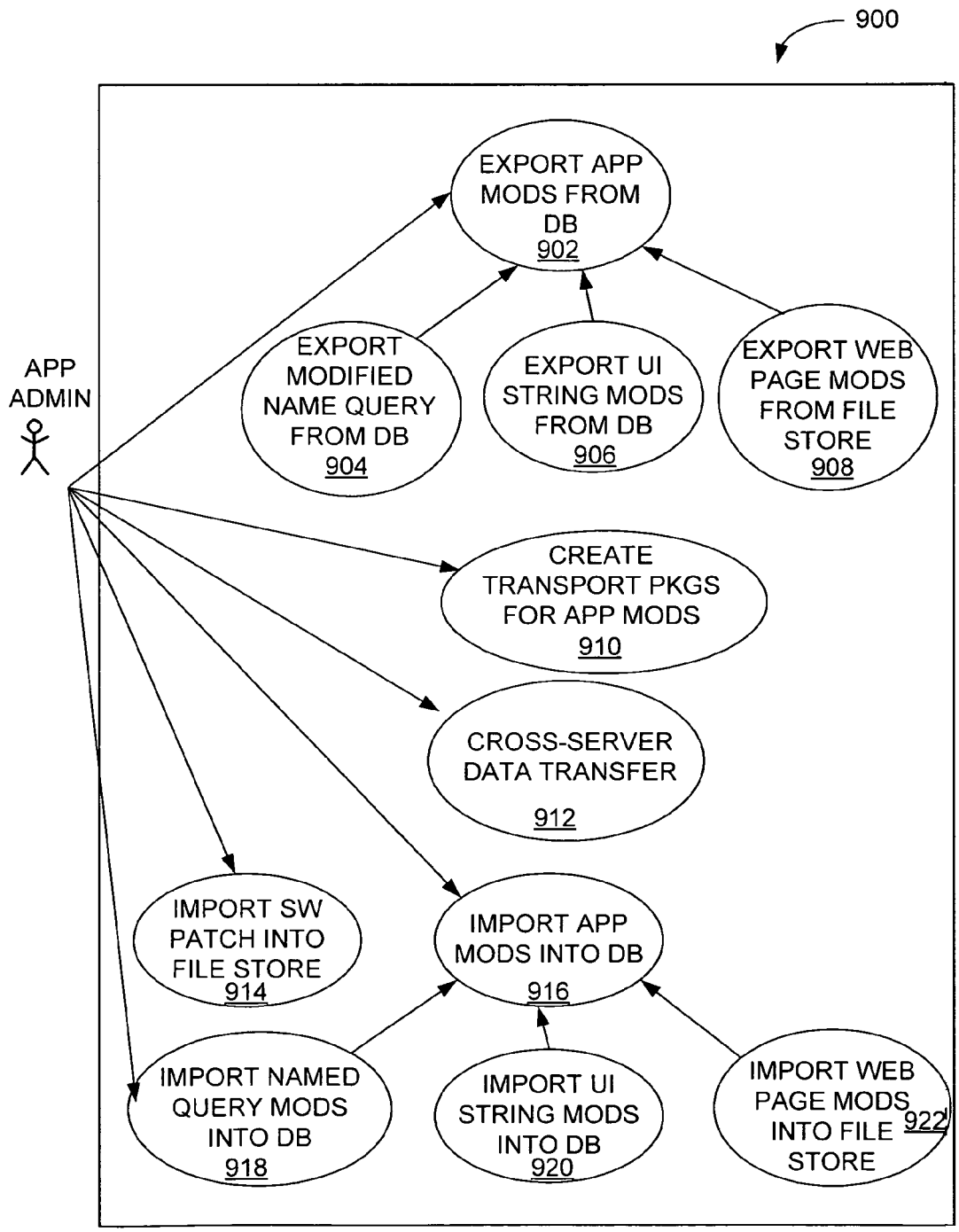
FIG. 25 illustrates multiple hot deployment scenarios 900, according to an example embodiment.
Figure 26:
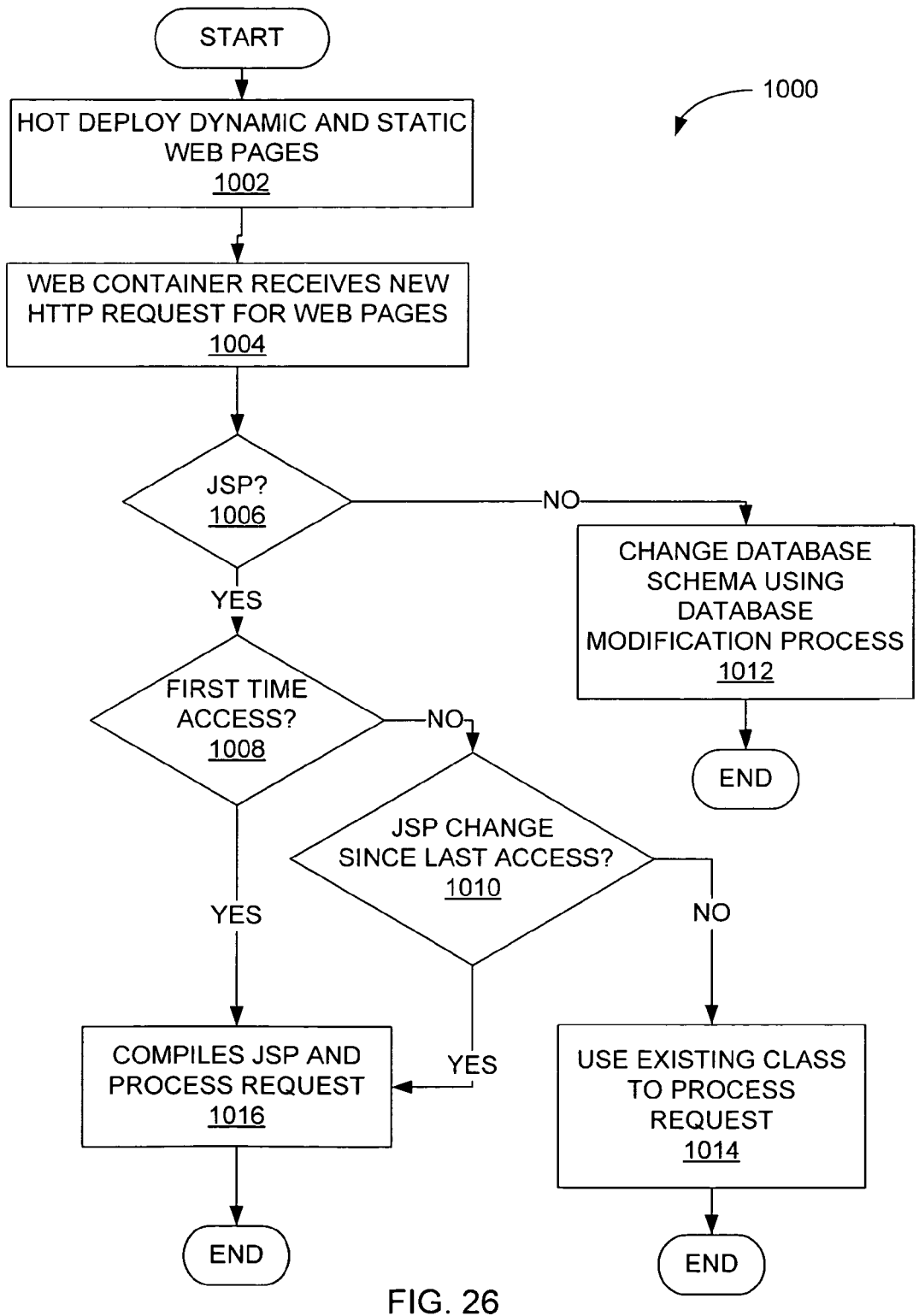
FIG. 26 illustrates a process 1000 for hot deployment of dynamic and static web pages, according to an example embodiment.

FIG. 25 illustrates various hot deployment scenarios 900, according to an example embodiment. As illustrated, an application administrator may export an application modification from a relational database, 902, wherein the exported applications modification includes a modified name query, 904, and UI string modification exported from the relational database, 906, as well as web page modifications from a file store, 908. Additionally, the application administrator may create transport packages for application modifications, 910, and implement cross-server data transfers, 912. The application administrator is also able to import application modifications into the relational database, 916, wherein the application modifications, including imported named query modifications, 918, and UI string modifications, 920, as well as web page modifications, 922. The application administrator is further able to import software patches into the file store, 914.

A process for hot deployment is illustrated in FIGS. 26 to 29. Starting with FIG. 26, the process 1000 starts with hot deployment of dynamic and/or static web pages, at 1002. The web container then receives a new HTTP request for web pages, at 1004, such as at the initiation of a session, or during a session. The process determines if the request is for a JSP, at 1006, and if so, determines if the request is for a first time access, at 1008. At 1006, if the request is not for a JSP, processing continues to change database schema using a database modification processing, at 1012. At 1008, if the request is for a first time access, the process compiles the JSP and processes the request, at 1016. If the request is not for a first time access, the process determines if the JSP has changed since the last access, at 1010, thus identifying a need to implement modifications. If the JSP has changed, then processing continues to step 1016. Otherwise, processing continues to use existing class information to process the request, at 1014.

Figure 27:
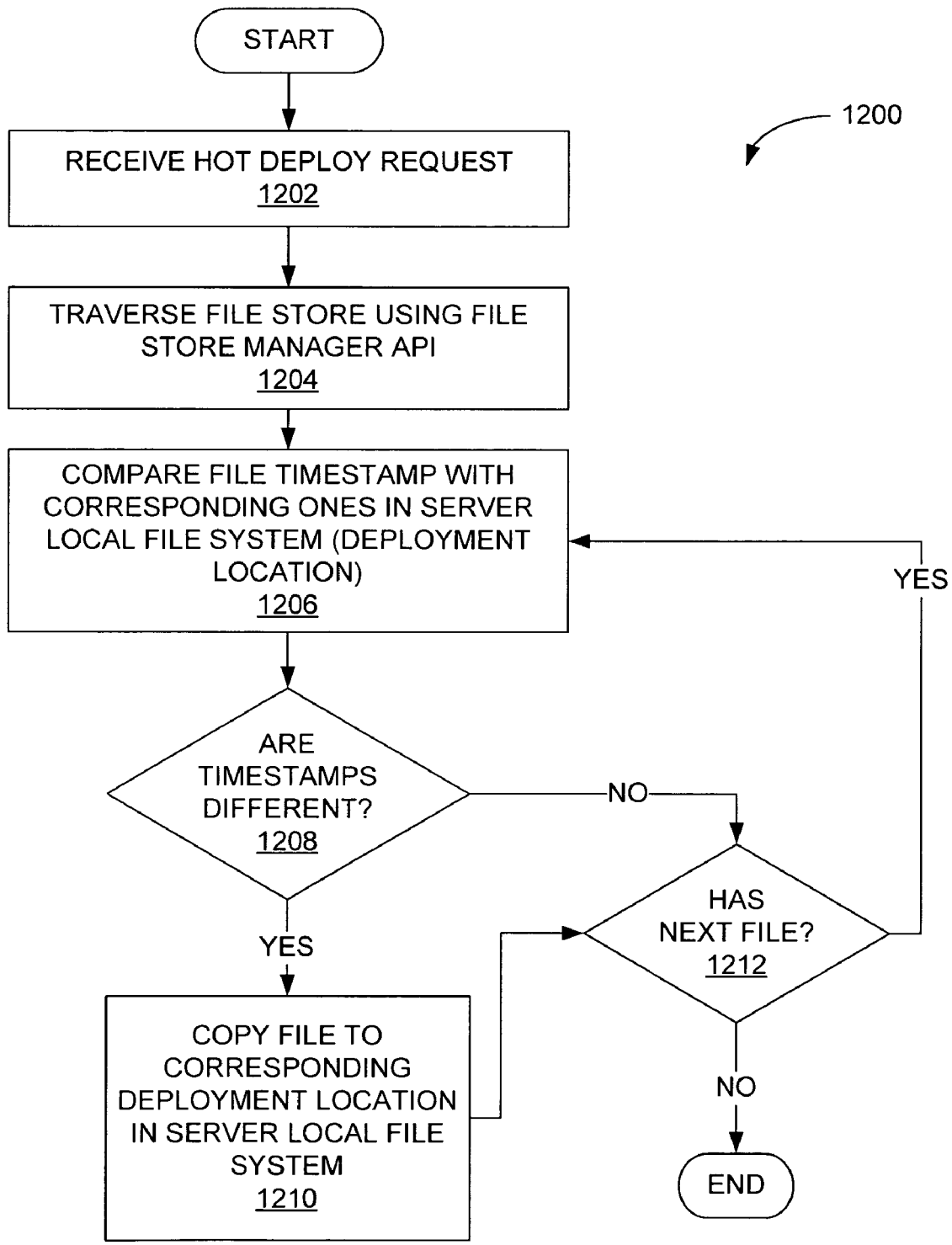
FIG. 27 illustrates an aspect of a hot deployment process 1200, wherein an integrated development system receives a request for hot deployment, according to one embodiment.

FIG. 27 illustrates another aspect of a hot deployment process, 1200, wherein an integrated development system receives a request for hot deployment, at 1202. The process 1200 is referred to as a smart deploy, as the process 1200 includes detection of modifications by timestamp comparison. The user 102 then traverses the file store data dictionary 204 using an API for the file store manager 312, at 1204. The process then compares a file timestamp with corresponding ones in a server local file system, such as at deployment locations, at 1206. At 1208, when the timestamps are different, processing continues to 1210 to copy the file to a corresponding deployment location in a server local file system. When the timestamps are the same at 1208, processing determines if there is another file to process, at 1212, and if so, returns to 1206 to compare timestamps for the next file. Otherwise, the process ends.

Figure 28:
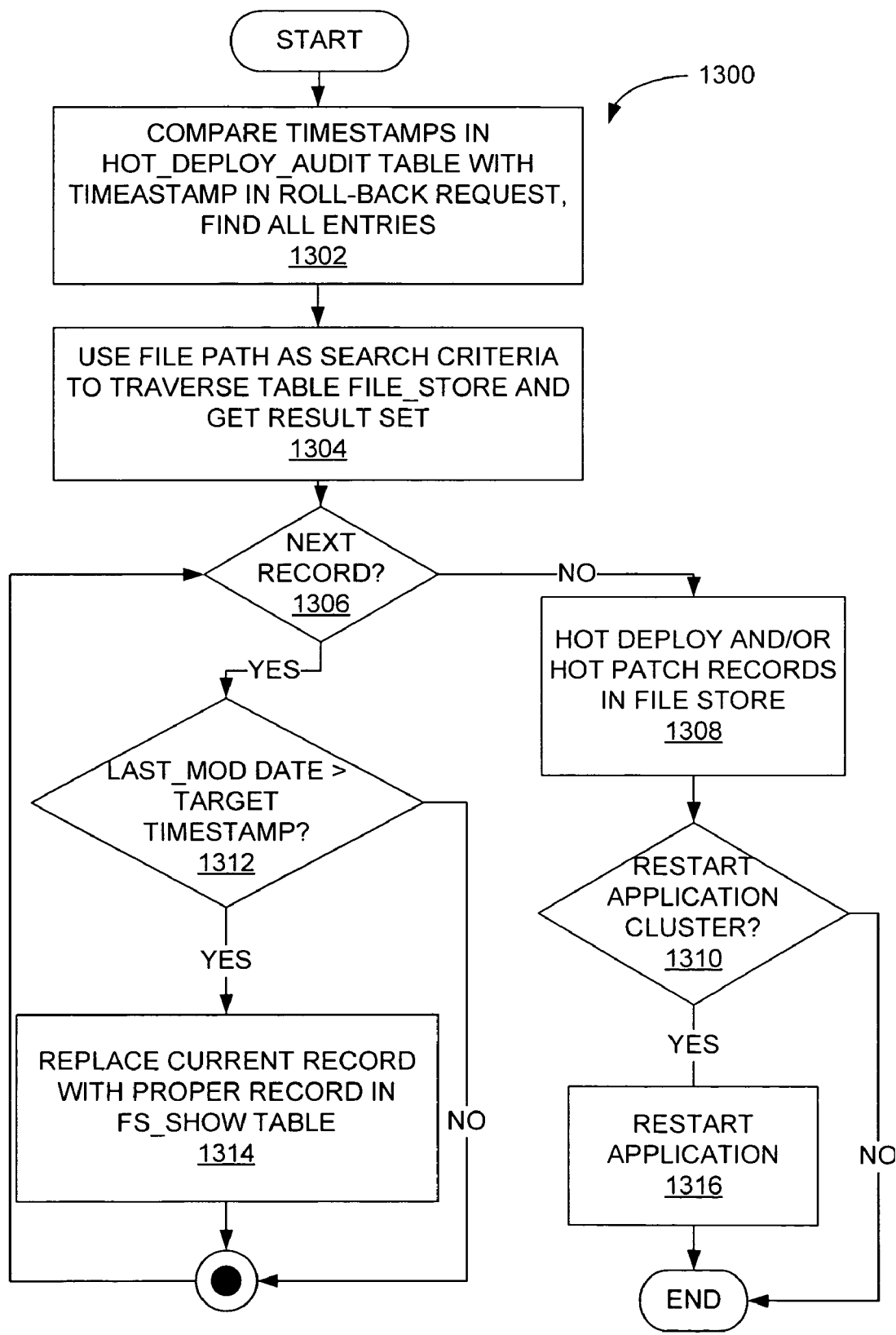
FIG. 28 illustrates a process 1300 for smart hot deployment of application modification, according to an example embodiment.

Still further, a process 1300, as illustrated in FIG. 28, begins by comparing a first timestamp in a table, referred to as HOT_DEPLOY_AUDIT table, to a second timestamp in a roll-back request, and finds all entries, at 1302. A roll-back is a request to use a previous version of an application or a component of an application. At 1304, the process uses a file path as a search criteria to traverse a table, referred to as FILE_STORE table, and returns a result set. At 1306, if there is a next record, the process determines if the last modified data is later than the target timestamp, at 1312. If the last modified date is later, the process replaces a current record with a new record in a table, referred to as a FS_SHOW table, at 1314. The process then continues for a next record. If, at 1306, there is no next record, processing continues to hot deploy (or hot patch) records in a file store, at 1308. At 1310, the process then determines if there is a need to restart the application cluster, and if so, restarts the application, at 1316. Otherwise, the process ends.

In one example embodiment, an integrated technology platform enables audits for change transport and deploy operations. Additionally, the auditing applies to persistent change history in relational database. Shadow table techniques are used to keep a change history of file store, named query and UI Strings. The shadow table technique retains information, such as historical information, regarding files and applications. Key to the shadowing technique is versioning, wherein each version of a file is maintained. Auditing information is stored in tables, such as those illustrated in FIGS. 17A, 17B, 18A, 18B, and 19.

Figure 29:
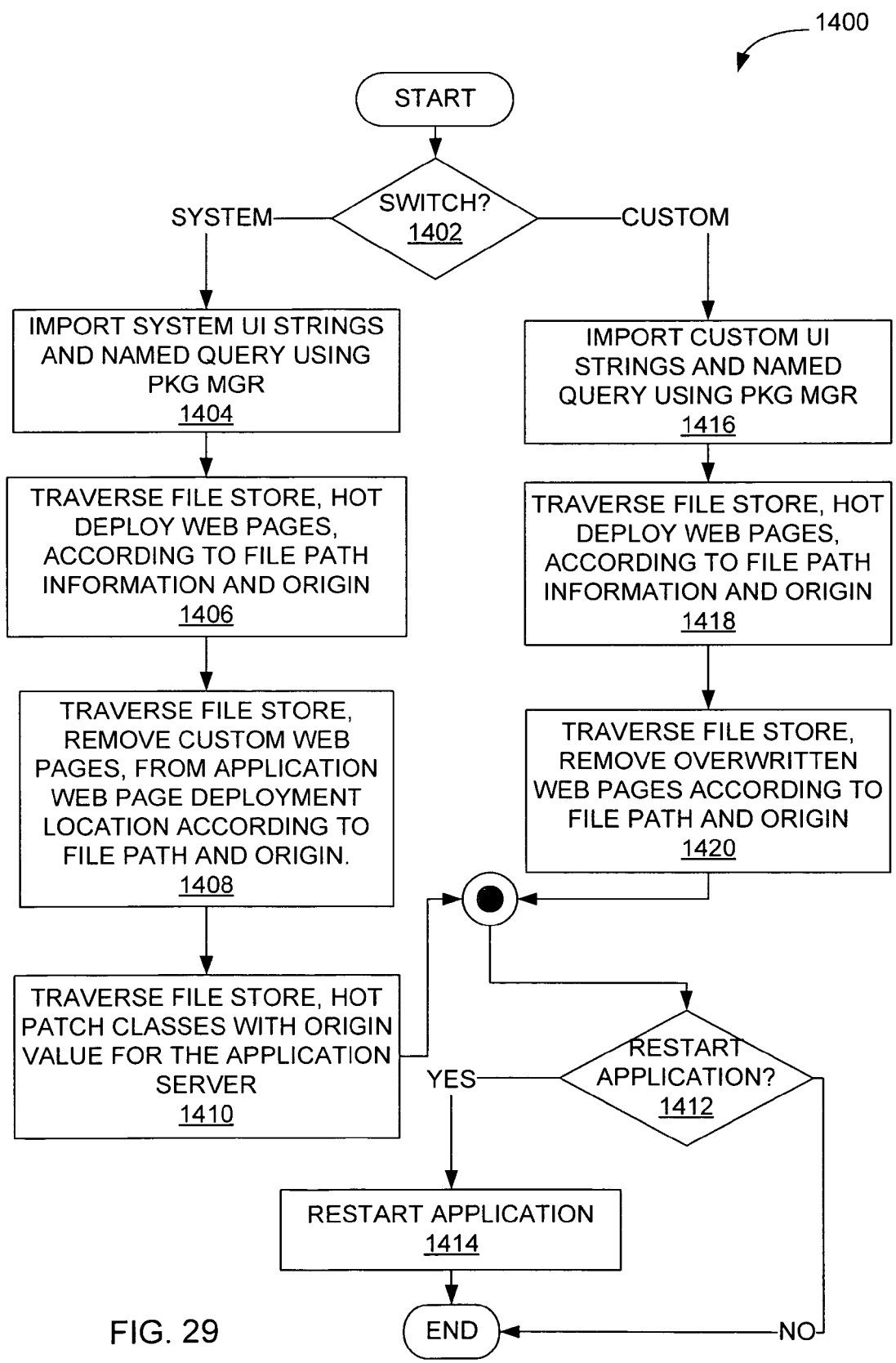
FIG. 29 illustrates a process 1400 for switching between a base application and a custom application, according to an example embodiment.

FIG. 29 illustrates a process 1400 for switching between a base application and a custom application, according to an example embodiment. The base application is provided by the integrated technology platform and does not include custom modifications by users, developers, etc. In one aspect, web sources delivered by an application server are stored in file store data dictionary 204. Stored web page files are accessed and used as templates to create custom web pages using file manager 752 and Eclipse plug-in 758 through a user interface. Once implemented, in response to a request to access a web page, pointers to the original web pages are redirected to the new custom web pages. The custom web pages are uploaded into file store data dictionary 204 following file path naming conventions. Such process design ensures that of code delivered by a software vendor is kept separate from consultant modifications. The separation enables flexible, efficient application support and maintenance. For example, if a consultant is having a problem with a modification in what appears to be base code, the consultant is able to execute the original code directly from the delivered application. If the code works in the delivered application but does not perform properly with the modification(s) included, there is likely an error in the modification(s). If the code fails in both locations, it is likely the error is in the software vendor's code. Another benefit applies to software upgrades, wherein a client is able to monitor the system upgrades and update such modifications if necessary. The system is modified by the software vendor and may be provided universally to multiple clients.

Continuing with FIG. 29, in the process 1400 it is first determined what type of switch is requested, at 1402. For a switch to the application server system, processing continues to import system UI strings and named query information using package manager 322, at 1404. At 1406, the process traverses file store data dictionary 204 and hot deploys web pages according to the file path information and origin information. The hot deploy is for application server web pages associated with the base application, including JSP, HTML, JAVAScript, CSS, and images. At 1408, the process traverses the file store data dictionary 204, and removes custom web pages, including JSP, HTML, JAVAScript, CSS, and images. The custom web pages are removed from the base application web page deployment location according to file path and origin information.

The package manager, such as package manager 322 of FIG. 8, during the process of implementing modifications, stores the modifications in the file store, such as file system 332 of FIG. 8 or file store data dictionary 204 of FIG. 6. If there is a modification in the file store with the same name, the prior file is not removed but archived and the modification is the new file. The stored new file retains the original file name with a new version identifier. This allows for incremental changes as well as a change history for auditing purposes. A switch is between a custom application (i.e., application version including client or customer modification) and system application (i.e., application including system modification). Here, a software vendor may create a modification, i.e., system modification.

If the client or customer creates a new version of the application, the package manager 322 will review the system modifications and may remove such information from the file store 332. The system modification may be removed from the file store 332 if the new version of the software as provided by the software vendor has these changes.

Continuing with FIG. 29, at 1410 the process traverses the file store data dictionary 204 and hot patches a plurality of classes or all classes, as well as classes in jar files with an origin value for the base application. For switches from system to custom applications, processing imports custom UI strings and named query information using package manager 322, at 1416. The process then traverses file store data dictionary 204, and hot deploys web pages, including JSP, HTML, JAVAScript, CSS and images, according to file path and origin information, at 1418. The process continues to traverse file store data dictionary 204 to remove overwritten web pages, including JSP, HTML, JAVAScript, CSS and images, according to file path and origin. Once the switch is completed, a determination is made as to whether to restart the application, at 1412, and if so the process restarts the application, at 1414. Otherwise, the process ends.

Figure 30:
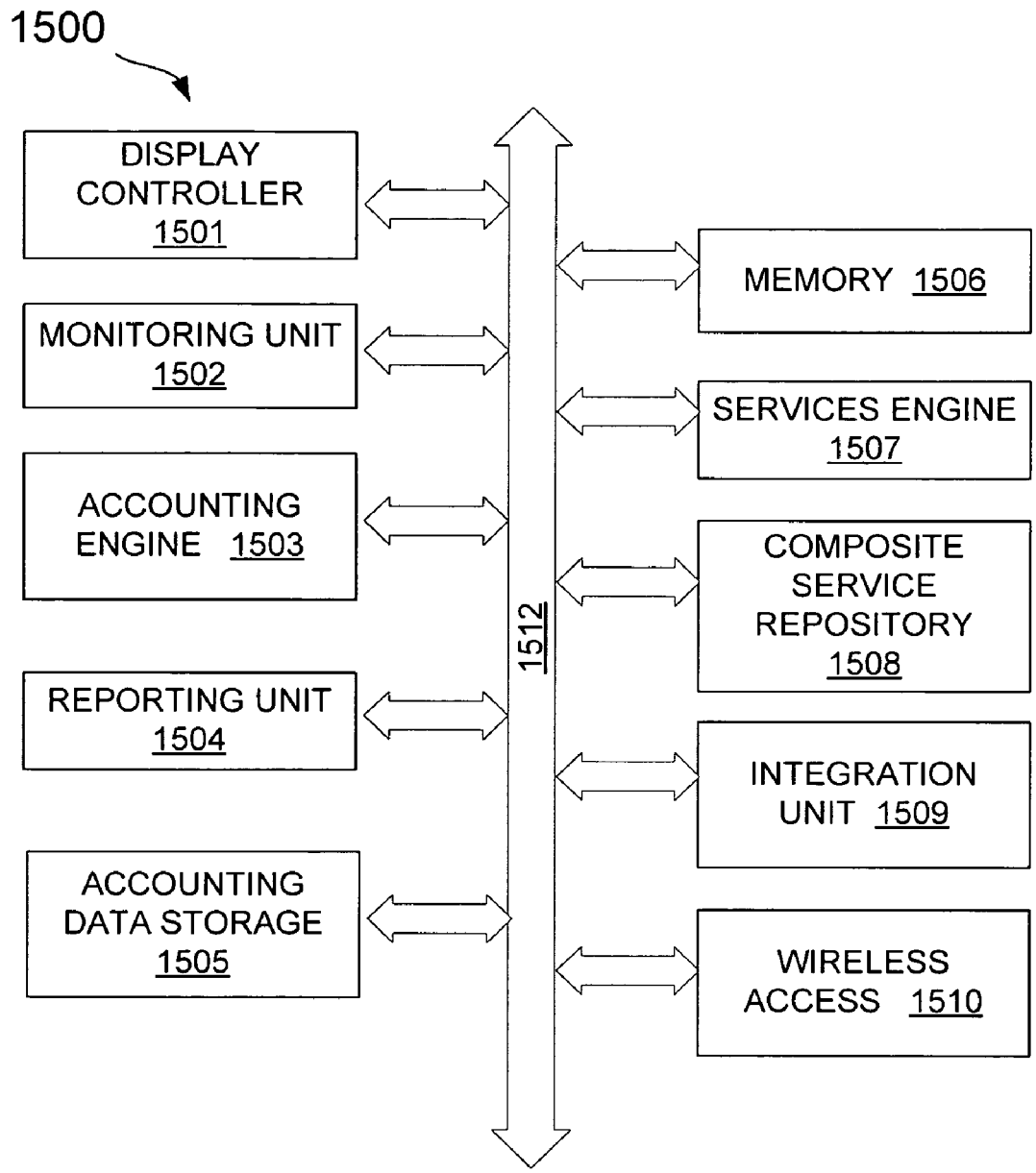
FIG. 30 is a diagram of a system implementing an accounting infrastructure for composite service, according to an example embodiment.

FIG. 30 illustrates a system 1500 for providing composite service and an integrated technology platform, such as integrated technology platform 200 of FIG. 6 or enterprise application platform 12 of FIG. 1. Communication within the system 1500 is through communication bus 1512. A display controller 1501 acts as part of a user interface to provide data and control instructions for display of service information, as well as auditing and versioning to the client. A services engine 1507 provides instructions and data for execution of at least one service of a composite service. The composite service repository 1508, in coordination with integration unit 1509, implements functions to enable a composite service system, such as illustrated in FIGS. 2 and 3. Wireless access 1510 provides communication with wireless devices and includes a transceiver (not shown). The system 1500 further includes accounting engine 1503, reporting unit 1504, monitoring unit 1502, and accounting data storage 1505. The accounting engine 1503 works with the services engine 1507 to identify operations and components to measure, initiating such measurement and monitoring by monitoring unit 1502. The measurements and statistics are provided to reporting unit 1504 and accounting data storage 1505. The reporting unit 1504 provides output information to display controller 1501, which is provided to client machines and modules for display for the user. The reporting unit and the accounting data storage also provide output information for use by other services or otherwise useful within a network. Communications transmitted by system 1500 may be formatted to use an XML, a Macromedia-XML (MXML), ActionScript, JAVAScript, HTML, or some other suitable format. The communications may be implemented by a physical or logical connection between modules including the monitoring unit 1502, accounting engine 1503, reporting unit 1504 and accounting data storage 1505. The system 1500 implements and generates objects and features, creates sets of object-related features, and filters the sets of object-related features for implementing an integrated technology platform or enterprise application platform. The blocks shown herein may be implemented in software, firmware, or hardware. The system 1500, or any of the units included therein, may be distributed to devices. Alternate systems may implement modules individually, or as a combination thereof.

Figure 31:
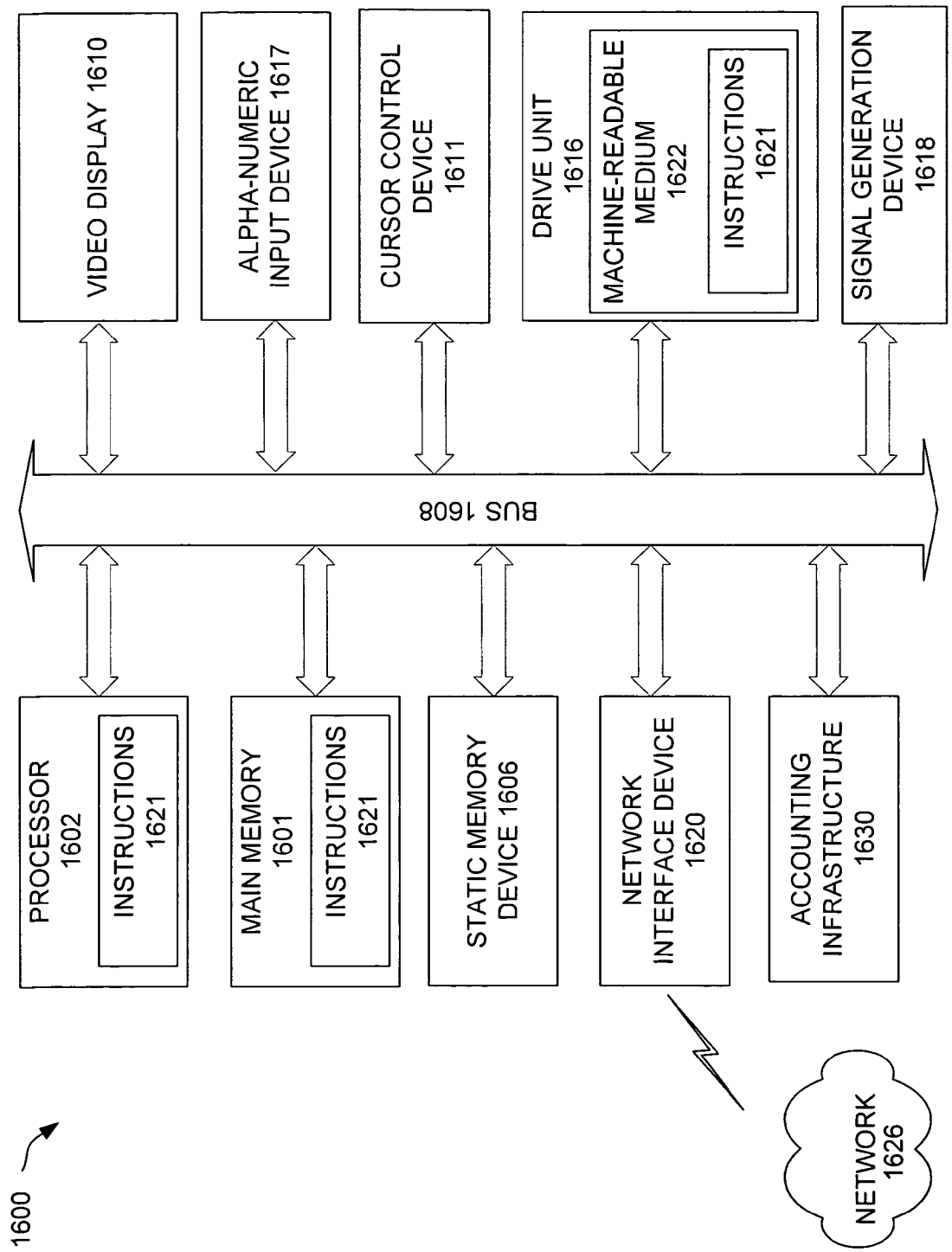
FIG. 31 is a diagram of a computer system implementing an accounting infrastructure for composite service, according to an example embodiment.

FIG. 31 illustrates a computer system 1600 for implementing composite service and enterprise application platform or integrated technology platform. The system 1600 executes a set of instructions to perform any one or more of the methodologies discussed herein. In alternative embodiments, the system 1600 operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description. In one embodiment, an accounting infrastructure is provided on individual client machines, wherein the accounting infrastructure at the client machine communicates with the application server in a central network-accessible location. The client machine is then able to enable, disable, and provide specific instructions for monitoring components. Additionally, the client machine is able to display results to a user, illustrating resource consumption according to operation and component. The user is then able to modify or request modification to applications and services to more efficiently use resources, including balancing resources among multiple users.

The example computer system 1600 includes a processor 1602, a main memory 1601, and a static memory 1606, which communicate with each other via a bus 1608. The computer system 1600 may further include a video display unit 1610 (e.g., a Liquid Crystal Display (LCD) or a Cathode Ray Tube (CRT)). The computer system 1600 also includes an alphanumeric input device 1617 (e.g., a keyboard), a User Interface (UI) cursor control device 1611 (e.g., a mouse), a drive unit 1616, a signal generation device 1618 (e.g., a speaker) and a network interface device (e.g., a transmitter) 1620.

The disk drive unit 1616 includes a machine-readable medium 1622 on which is stored one or more sets of instructions and data structures (e.g., software 1621) embodying or used by any one or more of the methodologies or functions illustrated herein. The software instructions 1621 may also reside, completely or at least partially, within the main memory 1601 and/or within the processor 1602 during execution thereof by the computer system 1600, with the main memory 1601 and the processor 1602 also constituting machine-readable media.

The instructions 1621 may further be transmitted or received over a network 1626 via the network interface device 1620 using any one of a number of well-known transfer protocols (e.g., HTTP, Secure Hyper Text Transfer Protocol (HTTPS)).

Accounting infrastructure module 1630 is communicatively coupled to bus 1608. This filtering module implements the filtering and subset generation discussed in the examples provided herein. Specifically, accounting infrastructure module 1630 controls function of the accounting modules of FIG. 30, including accounting engine 803, monitoring unit 802, reporting unit 804 and accounting data storage 805, and works with the services engine 807 and the composite service repository 808.

The term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding, or carrying a set of instructions for execution by the machine and that cause the machine to perform any one or more of the methodologies illustrated herein. The term "non-transitory machine-readable storage medium" shall accordingly be taken to include solid-state memories, optical and magnetic media.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "Software as a Service" (SaaS). For example, at least some of the operations may be performed by a group of computers (as examples of machines including processors), with these operations being accessible via a network (e.g., the Internet) and via one or more appropriate interfaces (e.g., APIs).

By way of example, such computer-readable media may include Random Access Memory (RAM), Read Only Memory (ROM), Erasable Programmable Read Only Memory (EPROM), Electrically Erasable Programmable Read Only Memory (EEPROM), Compact Disc-ROM (CD-ROM) or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. In the case that the computer-executable instructions are transformed, a first computer may, for example, transform the computer-executable instructions into the executable format and a second computer may execute the transformed instructions.

One embodiment is described in a general context of method operations which may be implemented by a computer program product. The computer program product may include computer-executable instructions, such as program code, executed by computers in networked environments. Generally, program modules include, for example, routines, programs, objects, components, or data structures that perform particular tasks or implement particular abstract data types. Computer-executable instructions, associated data structures, and program modules represent examples of program code for executing operations of the methods disclosed herein. The particular sequence of such executable instructions or associated data structures represents examples of corresponding acts for implementing the functions described in such operations.

Embodiments of the invention may be operated in a networked environment using logical connections to one or more remote computers having processors. Logical connections may include, for example, a LAN and a Wide Area Network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including PCs, hand-held devices, multi-processor systems, microprocessor-based or programmable consumer electronics, network PCs, minicomputers, mainframe computers, and the like. These concepts may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method in a distributed computing system, using a computing system including one or more machines, the method comprising:
   initiating a server application on a central server in a distributed computing environment, wherein server application code includes instructions for implementing the server application at the central server;
   applying a first timestamp to the server application on initiating the server application;
   generating client application code from the server application;
   transmitting the client application code to a client computing device in the distributed computing system, wherein the client application code includes instructions for implementing the client application code at the client computing device;
   implementing the client application code at the client computing device;
   modifying the client application code at the client computing device;
   applying a second timestamp to the client application code on modifying the client application code;
   transmitting the modified client application code from the client computing device to the central server;
   translating the modified client application code to generate modified server application code based on the second timestamp being later than the first timestamp;
   storing at least one file associated with the modified client application code to operate with the server application at the central server;
   storing an identifier for the at least one file to enable tracking of modifications to the server application; and
   hot deploying the modified server application code at the central server.

2. The method of claim 1, wherein timestamps are applied to files when stored in a file server associated with the server application and the method further comprises:
   auditing the server application to identify modifications received from the client computing device by comparing timestamps of files in the file server.

3. The method of claim 2, wherein the auditing is to isolate files associated with an error occurring in operation of the server application, and to determine when the error occurred for application of modifications from client computing devices to the server application.

4. The method of claim 3, further comprising:
   on identification of a first file associated with the error:
      determining a timestamp associated with implementation of the first file;
      reverting to a previous version of the server application having a timestamp prior to the timestamp associated with implementation of the first file.

5. The method of claim 4, wherein reverting to the previous version of the server application further comprises hot deploying a second file to replace the first file in the file server.

6. The method of claim 1, wherein implementing the modified server application code comprises applying a version identifier to the modified server application code.

7. The method of claim 6, wherein implementing the modified server application code further comprises storing a timestamp corresponding to a time of implementation.

8. The method of claim 7, further comprising:
   searching for a version of the server application code prior to a first time, the version identified by the timestamp of a first modified server application code; and
   implementing the first modified server application code at the central server.

9. The method of claim 1, wherein modifying the client application code comprises:
   receiving a modified named query from the client computing device;
   transporting the modified named query to a file server associated with the server application; and
   hot deploying the modified named query.

10. The method of claim 1, wherein modifying the client application code further comprises:
    receiving a modified database schema from the client computing device;
    transporting the modified database schema to a file server associated with the server application; and
    hot deploying the modified database schema.

11. The method of claim 1, further comprising:
    initiating a sandbox environment for modification of the application.

12. The method of claim 1, wherein implementing the modified server application code at the central server, further comprises implementing the modified server application code while maintaining operation of the application.

13. The method of claim 8, wherein the modified server application code is implemented without reinstalling the server application.

14. The method of claim 1, further comprising:
    accessing a data dictionary describing a server application schema; and
    modifying the data dictionary to amend the server application schema.

15. A system for modifying applications in a distributed computing environment, the system comprising a plurality of modules, each module comprising instructions retained on at least one non-transitory machine-readable storage medium that, when executed by a machine, perform identified operations, wherein the modules comprise:
    a modification module to implement modifications to a server application, the server application having been associated with a first timestamp upon initiation of the server application;
    a package manager module to receive modified client application code, the modified client application code having been associated with a second timestamp on modification, the package manager module to translate the modified client application code to generate modified server application code based on the second timestamp being later than the first timestamp;
    a file store to store versions of the server application; and
    a hot deployment module to implement the modified server application code to the server application while maintaining operation of the server application.

16. A method, comprising:
    initiating a server application on a central server in a distributed computing environment, wherein server application code includes instructions for implementing the server application at the central server;
    applying a first timestamp to the server application on initiating the server application;
    generating client application code from the server application, wherein the client application code includes instructions for implementing the client application code at a client computing device;

receiving modified client application code from the client computing device, the modified client application code having been associated with a second timestamp on modification;

translating the modified client application code to generate modified server application code based on the second timestamp being later than the first timestamp; and implementing the modified server application code at the central server while maintaining operation of the server application, the implementing of the modified server application code comprising applying a version identifier to the modified server application code and storing a third timestamp corresponding to a time of implementation of the modified server application code.

17. The method of claim 16, further comprising:
auditing the server application to identify a first modified server application code prior to the third timestamp and implementing the first modified server application code.

18. The method of claim 16, further comprising storing versions of the server application, along with version identifiers and timestamps in a file store.

19. The method of claim 18, further comprising:
auditing versions of the server application stored in the file store by searching for a version of the server application code prior to the third timestamp, the version identified by a timestamp of the first modified server application code; and
implementing the first modified server application code at the central server.

20. The method of claim 16, wherein the modified client application code includes modifications to a named query of the server application.

21. The method of claim 16, wherein the modified client application code further includes modifications to a database schema of the server application.

22. The method of claim 16, wherein the modified server application code is implemented without reinstalling the server application.

23. A method, comprising:
initiating a server application on a central server in a distributed computing environment, wherein server application code includes instructions for implementing the server application at the central server;
applying a first timestamp to the server application on initiating the server application;
generating client application code from the server application, wherein the client application code includes instructions for implementing the client application code at a client computing device;
receiving modified client application code from the client computing device, the modified application code having been associated with a second timestamp on modification;
translating the modified client application code to generate modified server application code based on the second timestamp being later than the first timestamp; and
implementing the modified server application code at the central server while maintaining operation of the server application.

24. A non-transitory machine-readable storage medium embodying instructions which, when executed by a machine, cause the machine to perform operations comprising:
initiating a server application on a central server in a distributed computing environment, wherein server application code includes instructions for implementing the server application at the central server;

applying a first timestamp to the server application on initiating the server application;
generating client application code from the server application, wherein the client application code includes instructions for implementing the client application code at the a client computing device;
receiving modified client application code from the client computing device, the modified client application code having been associated with a second timestamp upon modification;
translating the modified client application code to generate modified server application code based on the second timestamp being later than the first timestamp; and
implementing the modified server application code at the central server while maintaining operation of the server application.

25. A method in a distributed computing system, using a computing system including one or more machines, the method comprising:
receiving client application code at a client computing device in a distributed computing system, wherein the client application code includes instructions for implementing the client application code at the client computing device;
implementing the client application code at the client computing device;
initiating a sandbox environment at the client computing device while a server application is operating at a central server, the server application having been associated with a first timestamp upon initiation of the server application at the central server;
modifying the client application code at the client computing device;
applying a second timestamp to the client application code on modifying the client application code; and
transmitting the modified client application code from the client computing device to the central server, wherein the server application implements the modified client application code while the server application is operating based on the second timestamp being later than the first timestamp.

26. The method of claim 25, wherein the modified client application code includes modifications to a named query.

27. The method of claim 25, wherein the modified client application code includes modifications to database schema.

28. The method of claim 25, wherein the modified client application code includes modifications to text strings.

29. The method of claim 25, further comprising auditing the server application to identify an operational point prior to the first timestamp, and implementing a version of the server application prior to the first timestamp.

30. The method of claim 25, wherein the server application implements the modified client application code while the server application is operating by replacing at least one application file with a new file.

31. The method of claim 25, wherein the server application implements the modified client application code while the server application is operating by replacing application data with a new application data.

32. An enterprise architecture platform, comprising:
an application server to implement a server application, the server application configured according to an application schema, the application server to apply a first timestamp to the server application on initiating the server application;
an application database schema unit storing information describing the application schema; and a file system to store files associated with the server application;

wherein the application server comprises:

a package manager to receive a client modification, the client modification having been associated with a second timestamp, the package manager to process the client modification to the server application based on the second timestamp being later than the first timestamp; and a hot deployment publisher to publish the client modifications in the file system.

33. The enterprise architecture platform of claim 32, wherein the file system stores JAVA files, wherein the JAVA files are hot fixed to a deployment location in the file system.

\* \* \* \* \*